US012756598B2

(12) United States Patent
Vitthaladevuni et al.

(10) Patent No.: US 12,756,598 B2
(45) Date of Patent: Oct. 6, 2026

(54) CAPABILITY AND CONFIGURATION OF A DEVICE FOR PROVIDING CHANNEL STATE FEEDBACK

(71) Applicant: QUALCOMM Incorporated, San Diego, CA (US)

(72) Inventors: Pavan Kumar Vitthaladevuni, San Diego, CA (US); Alexandros Manolakos, Escondido, CA (US); Taesang Yoo, San Diego, CA (US); Naga Bhushan, San Diego, CA (US); June Namgoong, San Diego, CA (US); Jay Kumar Sundararajan, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 755 days.

(21) Appl. No.: 18/004,267

(22) PCT Filed: Aug. 13, 2021

(86) PCT No.: PCT/US2021/071187
§ 371 (c)(1),
(2) Date: Jan. 4, 2023

(87) PCT Pub. No.: WO2022/040664
PCT Pub. Date: Feb. 24, 2022

(65) Prior Publication Data
US 2023/0275787 A1 Aug. 31, 2023

(30) Foreign Application Priority Data
Aug. 18, 2020 (GR) .............................. 20200100487

(51) Int. Cl.
*H04L 25/02* (2006.01)
*G06N 3/045* (2023.01)

(52) U.S. Cl.
CPC ......... *H04L 25/0254* (2013.01); *G06N 3/045* (2023.01)

(58) Field of Classification Search
CPC . H04L 25/0254; H04L 25/0226; G06N 3/045; G06N 3/0442; G06N 3/0455;
(Continued)

(56) References Cited

U.S. PATENT DOCUMENTS

| | | | | |
|---|---|---|---|---|
| 11,397,893 | B2 * | 7/2022 | Wang | H04L 41/16 |
| 11,792,055 | B2 * | 10/2023 | Wang | G06N 3/045 370/252 |

(Continued)

FOREIGN PATENT DOCUMENTS

| | | | | |
|---|---|---|---|---|
| EP | 3471314 A1 * | 4/2019 | | H04L 5/16 |
| WO | WO-2021086308 A1 * | 5/2021 | | G06N 20/00 |

OTHER PUBLICATIONS

International Search Report and Written Opinion—PCT/US2021/071187—ISA/EPO—Dec. 9, 2021.

*Primary Examiner* — Kevin T Bates
*Assistant Examiner* — Poonam Sharma
(74) *Attorney, Agent, or Firm* — Harrity & Harrity LLP

(57) ABSTRACT

In some aspects, a first device may transmit a neural network capability indication that indicates a capability of the first device associated with training at least one channel state feedback (CSF) neural network for facilitating providing CSF. The first device may receive, based at least in part on the capability of the first device, a CSF neural network configuration that indicates at least one parameter associated with the at least one CSF neural network. Numerous other aspects are provided.

30 Claims, 19 Drawing Sheets

(58) Field of Classification Search
CPC ...... G06N 3/0464; G06N 3/0495; G06N 3/08; G06N 3/082; G06N 3/09
See application file for complete search history.

(56) References Cited

U.S. PATENT DOCUMENTS

| | | | | |
|---|---|---|---|---|
| 2015/0124638 A1* | 5/2015 | Sun | H04L 1/0026 | |
| | | | 370/252 | |
| 2018/0367192 A1* | 12/2018 | O'Shea | H04B 7/0452 | |
| 2021/0049451 A1* | 2/2021 | Wang | G06N 3/0464 | |
| 2023/0118031 A1* | 4/2023 | Cai | H04B 7/0417 | |
| | | | 706/25 | |

* cited by examiner

CAPABILITY AND CONFIGURATION OF A DEVICE FOR PROVIDING CHANNEL STATE FEEDBACK

CROSS-REFERENCE TO RELATED APPLICATIONS

This Patent Application is a 371 national stage of PCT Application No. PCT/US2021/071187 filed on Aug. 13, 2021, entitled "CAPABILITY AND CONFIGURATION OF A DEVICE FOR PROVIDING CHANNEL STATE FEEDBACK." which claims priority to Greece patent application Ser. No. 20200100487, filed on Aug. 18, 2020, entitled "CAPABILITY AND CONFIGURATION OF A DEVICE FOR PROVIDING CHANNEL STATE FEEDBACK," and assigned to the assignee hereof. The disclosure of the prior Applications are considered part of and are incorporated by reference into this Patent Application.

INTRODUCTION

Aspects of the present disclosure generally relate to wireless communication and to techniques and apparatuses for channel state information reporting.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a first device includes transmitting a neural network capability indication. The neural network capability indication indicates a capability of the first device associated with training at least one channel state feedback (CSF) neural network for facilitating providing CSF. The method also includes receiving, based at least in part on the capability of the first device, a CSF neural network configuration that indicates at least one parameter associated with the at least one CSF neural network.

In some aspects, a method of wireless communication performed by a second device includes receiving a neural network capability indication that indicates a capability of a first device associated with training at least one CSF neural network for facilitating providing CSF. The method also includes transmitting, based at least in part on the capability of the first device, a CSF neural network configuration that indicates at least one parameter associated with the at least one CSF neural network.

In some aspects, a first device for wireless communication includes a memory and one or more processors coupled to the memory. The one or more processors are configured to transmit a neural network capability indication. The neural network capability indication indicates a capability of the first device associated with training at least one CSF neural network for facilitating providing CSF. The one or more processors are also configured to receive, based at least in part on the capability of the first device, a CSF neural network configuration that indicates at least one parameter associated with the at least one CSF neural network.

In some aspects, a second device for wireless communication includes a memory and one or more processors coupled to the memory. The one or more processors are configured to receive a neural network capability indication that indicates a capability of a first device associated with training at least one CSF neural network for facilitating providing CSF. The one or more processors are also configured to transmit, based at least in part on the capability of the first device, a CSF neural network configuration that indicates at least one parameter associated with the at least one CSF neural network.

In some aspects, a non-transitory computer-readable medium storing a set of instructions for wireless communication includes one or more instructions that, when executed by one or more processors of a first device, cause the first device to transmit a neural network capability indication. The neural network capability indication indicates a capability of the first device associated with training at least one CSF neural network for facilitating providing CSF. The one or more instructions also cause the first device to receive, based at least in part on the capability of the first device, a CSF neural network configuration. The CSF neural network configuration indicates at least one parameter associated with the at least one CSF neural network.

In some aspects, a non-transitory computer-readable medium storing a set of instructions for wireless communication includes one or more instructions that, when executed by one or more processors of a second device, cause the second device to receive a neural network capability indication. The neural network capability indication indicates a capability of a first device associated with training at least one CSF neural network for facilitating providing CSF. The one or more instructions also cause the second device to transmit, based at least in part on the capability of the first device, a CSF neural network configuration that indicates at least one parameter associated with the at least one CSF neural network.

In some aspects, an apparatus for wireless communication includes means for transmitting a neural network capability indication that indicates a capability of the apparatus associated with training at least one CSF neural network for facilitating providing CSF. The apparatus also includes means for receiving, based at least in part on the capability of the first device, a CSF neural network configuration that indicates at least one parameter associated with the at least one CSF neural network.

In some aspects, an apparatus for wireless communication includes means for receiving a neural network capability indication that indicates a capability of a first device associated with training at least one CSF neural network for facilitating providing CSF. The apparatus also includes means for transmitting, based at least in part on the capability of the first device, a CSF neural network configuration that indicates at least one parameter associated with the at least one CSF neural network.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
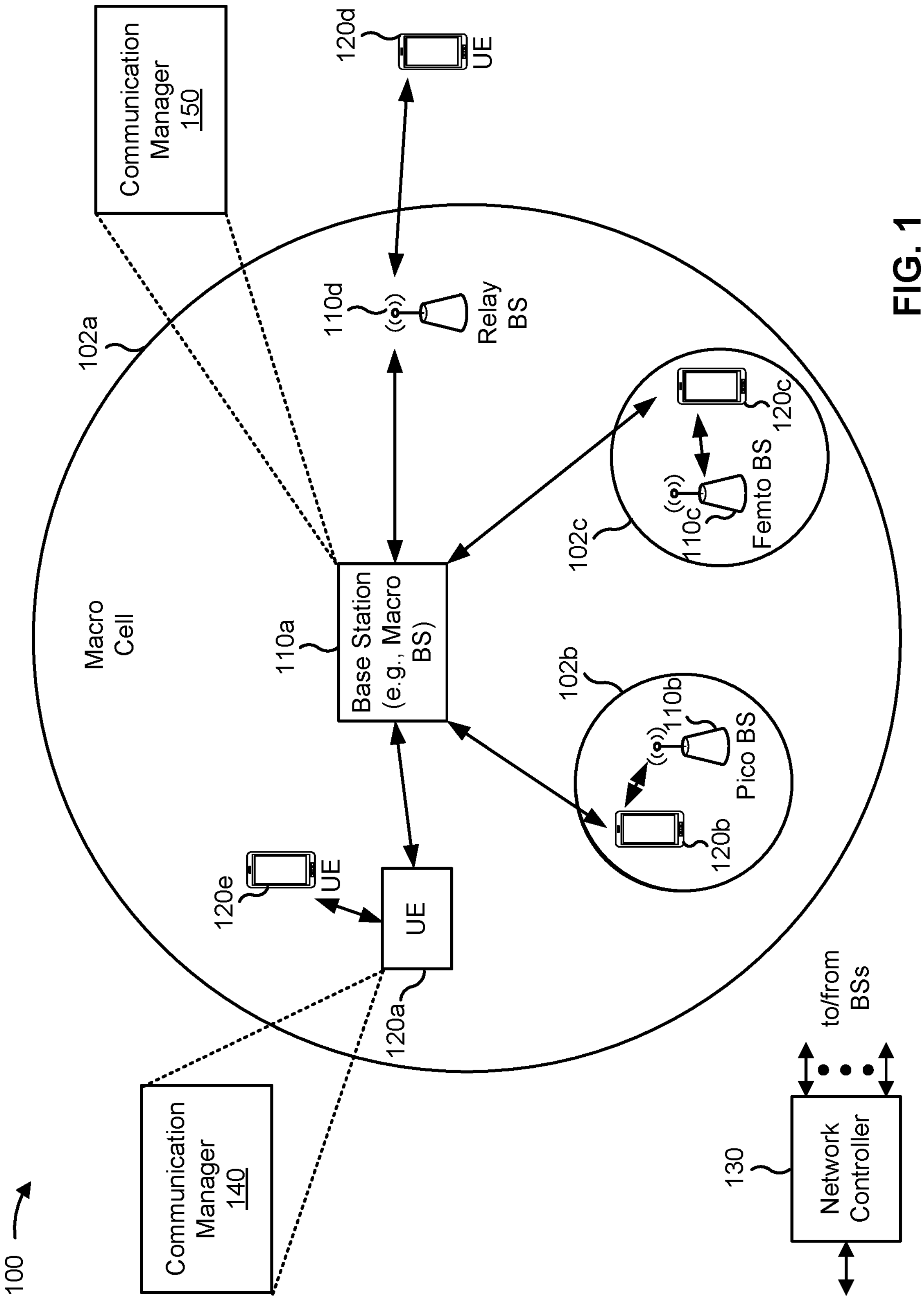
FIG. 1 is a diagram illustrating an example of a wireless network, in accordance with the present disclosure.

An encoding device operating in a network may measure reference signals and/or the like to report to a network entity. For example, the encoding device may measure reference signals during a beam management process for channel state feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like. However, reporting this information to the base station may consume communication and/or network resources.

In some aspects described herein, an encoding device (e.g., a UE, a base station, a transmit receive point (TRP), a network device, a low-earth orbit (LEO) satellite, a medium-earth orbit (MEO) satellite, a geostationary earth orbit (GEO) satellite, a high elliptical orbit (HEO) satellite, and/or the like) may train one or more neural networks to learn dependence of measured qualities on individual parameters, isolate the measured qualities through various layers of the one or more neural networks (also referred to as "operations"), and compress measurements in a way that limits compression loss. In some aspects, the encoding device may use a nature of a quantity of bits being compressed to construct a process of extraction and compression of each feature (also referred to as a dimension) that affects the quantity of bits. In some aspects, the quantity of bits may be associated with sampling of one or more reference signals and/or may indicate channel state information. For example, the encoding device may encode measurements, to produce compressed measurements, using one or more extraction operations and compression operations associated with a neural network with the one or more extraction operations and compression operations being based at least in part on a set of features of the measurements.

The encoding device may transmit the compressed measurements to a network entity, such as server, a TRP, another UE, a base station, and/or the like. Although examples described herein refer to a base station as the decoding device, the decoding device may be any network entity. The network entity may be referred to as a "decoding device."

The decoding device may decode the compressed measurements using one or more decompression operations and reconstruction operations associated with a neural network. The one or more decompression and reconstruction operations may be based at least in part on a set of features of the compressed data set to produce reconstructed measurements. The decoding device may use the reconstructed measurements as channel state information feedback.

As described herein, an encoding device operating in a network may measure reference signals and/or the like to report to a decoding device. For example, an encoding device may receive a neural network based channel state information (CSI) reference signal (CSI-RS). The encoding device may measure neural network based CSI based at least in part on the CSI-RS. Neural network based CSI may include any number of different features, characteristics, and/or the like. Neural network based CSI may compress the channel information associated with the CSI-RS in a more comprehensive form than, for example, non-neural network based Type-II CSI or Type-I CSI. Type I CSI is a beam selection scheme wherein an encoding device selects best beam indices and sends CSI information to a decoding device. Type II CSI is a beam-combination scheme, where the encoding device also computes a best linear combination of coefficients of various beams and sends back the beam indices and the coefficients used for combining them, on a sub-band (e.g., configured sub-band) basis. For example, in Type-II CSI, the sub-band size may be fixed for all sub-bands, which may result in limited granularity. Neural network based CSI may facilitate greater granularity by facilitating providing information regarding an entire channel. Neural network based CSI also may be specified to compress certain sub-bands with greater accuracy or less accuracy.

In some aspects, neural network based CSI also may facilitate multiple user (MU) multiple input multiple output (MU-MIMO) operation at a decoding device, by facilitating providing information about a channel and interference, thereby enabling the decoding device to manage and group users, and/or the like. Machine-learning based reporting of CSF may facilitate the use of neural network based CSI. However, different encoding devices may have different capabilities for training and/or implementing neural networks for encoding CSF. As a result, configuring encoding devices with a uniform neural network or system of neural networks may result in differing levels of performance and/or workability with regard to different encoding devices.

According to aspects of the techniques and apparatuses described herein, an encoding device may be configured with one or more neural networks based at least in part on a capability of the encoding device. In some aspects, an encoding device may transmit a neural network capability indication that indicates a capability of the encoding device associated with training at least one CSF neural network for facilitating providing CSF. A decoding device may receive the capability indication and may determine a CSF neural network configuration based at least in part on the capability indication. The decoding device may transmit the CSF neural network configuration to the encoding device. In this way, differences in capabilities of encoding devices may be taken into account during configuration of neural networks. As a result, neural networks may be configured so as to maximize the capabilities of an encoding device and decoding devices may be able to better predict performance levels and manage neural network updates, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a communication manager 140. As described in more detail elsewhere herein, the communication manager 140 may transmit a neural network capability indication that indicates a capability of the first device associated with training at least one channel state feedback (CSF) neural network for facilitating providing CSF; and receive, based at least in part on the capability of the first device, a CSF neural network configuration that indicates at least one parameter associated with the at least one CSF neural network. Additionally, or alternatively, the communication manager 140 may perform one or more other operations described herein.

In some aspects, the base station 110 may include a communication manager 150. As described in more detail elsewhere herein, the communication manager 150 may receive a neural network capability indication that indicates a capability of a first device associated with training at least one CSF neural network for facilitating providing CSF; and transmit, based at least in part on the capability of the first device, a CSF neural network configuration that indicates at least one parameter associated with the at least one CSF neural network. Additionally, or alternatively, the communication manager 150 may perform one or more other operations described herein.

As indicated above, FIG. 1 is provided merely as an example. Other examples may differ from what is described with regard to FIG. 1.

Figure 2:
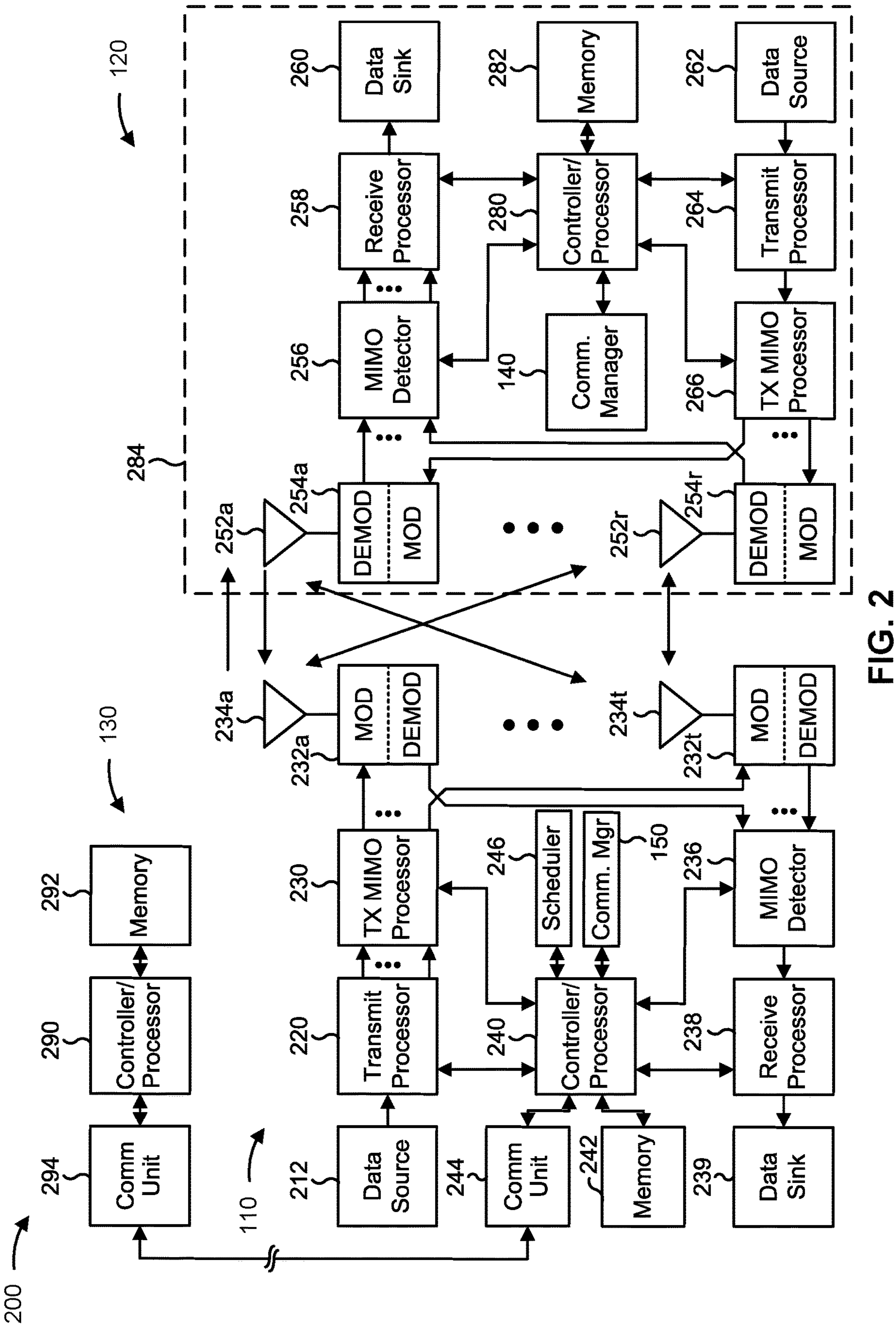
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with capability and configuration of a device for providing CSF feedback, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1800 of FIG. 18, process 1900 of FIG. 19, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example process 1000 of FIG. 10, process 1100 of FIG. 11, process 1800 of FIG. 18, process 1900 of FIG. 19, and/or other processes as described herein. In some aspects, executing instructions may include running the instructions, converting the instructions, compiling the instructions, and/or interpreting the instructions, among other examples.

In some aspects, the UE 120 may include means for transmitting a neural network capability indication that indicates a capability of the first device associated with training at least one CSF neural network for facilitating providing CSF, means for receiving, based at least in part on the capability of the first device, a CSF neural network configuration that indicates at least one parameter associated with the at least one CSF neural network, and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, the base station 110 may include means for receiving a neural network capability indication that indicates a capability of a first device associated with training at least one CSF neural network for facilitating providing CSF, means for transmitting, based at least in part on the capability of the first device, a CSF neural network configuration that indicates at least one parameter associated with the at least one CSF neural network, and/or the like. Additionally, or alternatively, the base station 110 may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
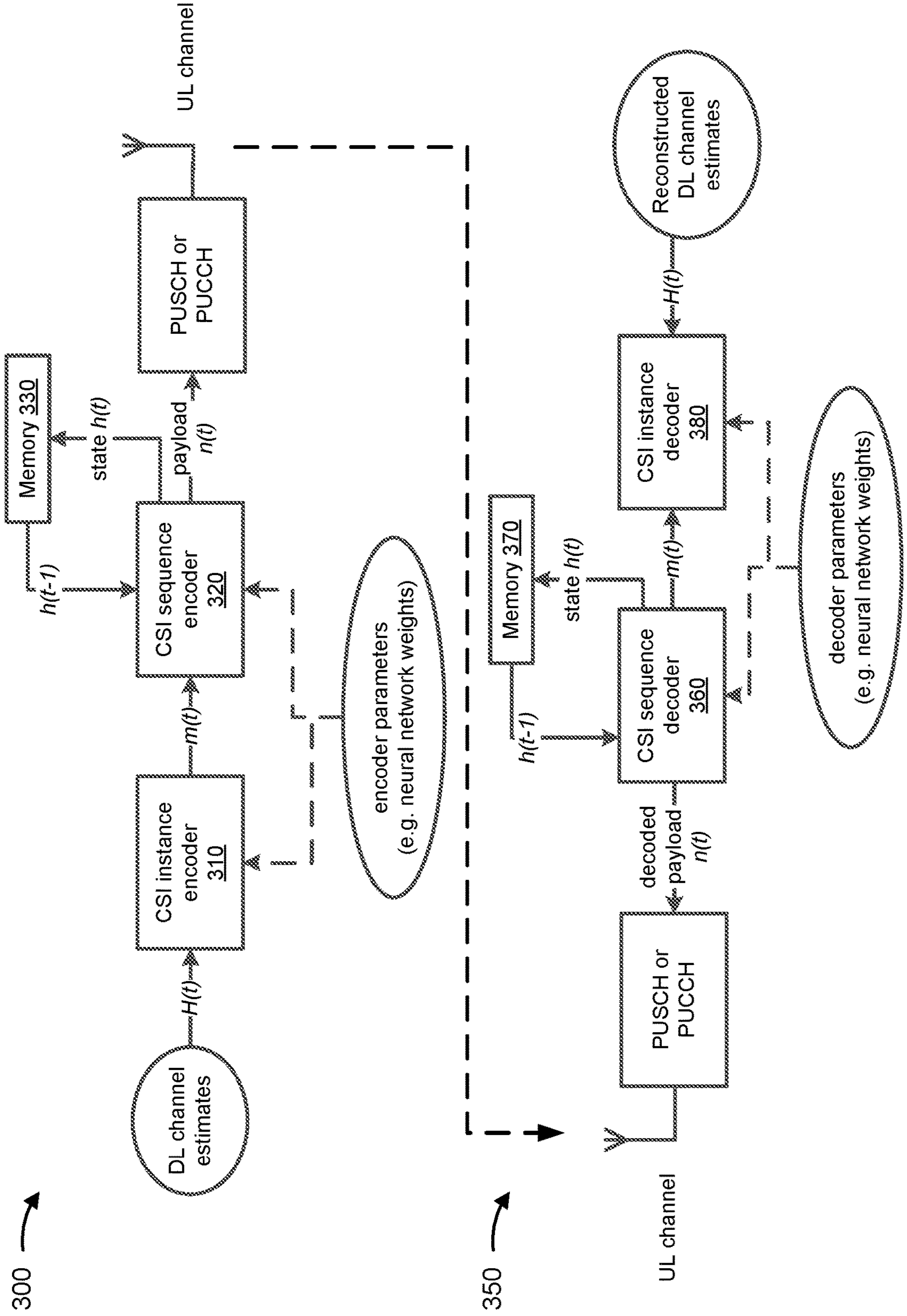
FIG. 3 is a diagram illustrating an example of an encoding device and a decoding device that use previously stored channel state information, in accordance with the present disclosure.

FIG. 3 illustrates an example of an encoding device 300 and a decoding device 350 that use previously stored channel state information (CSI), in accordance with the present disclosure. FIG. 3 shows the encoding device 300 (e.g., UE 120) with a CSI instance encoder 310, a CSI sequence encoder 320, and a memory 330. FIG. 3 also shows the decoding device 350 (e.g., BS 110) with a CSI sequence decoder 360, a memory 370, and a CSI instance decoder 380.

In some aspects, the encoding device 300 and the decoding device 350 may take advantage of a correlation of CSI instances over time (temporal aspect), or over a sequence of CSI instances for a sequence of channel estimates. The encoding device 300 and the decoding device 350 may save and use previously stored CSI and encode and decode only a change in the CSI from a previous instance. This may provide for less CSI feedback overhead and improve performance. The encoding device 300 may also be able to encode more accurate CSI, and neural networks may be trained with more accurate CSI.

As shown in FIG. 3, CSI instance encoder 310 may encode a CSI instance into intermediate encoded CSI for each DL channel estimate in a sequence of DL channel estimates. CSI instance encoder 310 (e.g., a feedforward network) may use neural network encoder weights θ. The intermediate encoded CSI may be represented as $m(t) \triangleq f_{enc,\theta}(H(t))$. CSI sequence encoder 320 (e.g., a Long Short-Term Memory (LSTM) network) may determine a previously encoded CSI instance h(t−1) from memory 330 and compare the intermediate encoded CSI m(t) and the previously encoded CSI instance h(t−1) to determine a change n(t) in the encoded CSI. The change n(t) may be a part of a channel estimate that is new and may not be predicted by the decoding device 350. The encoded CSI at this point may be represented by $[n(t), h_{enc}(t)] \triangleq g_{enc,\theta}(m(t), h_{enc}(t-1))$. CSI sequence encoder 320 may provide this change n(t) on the physical uplink shared channel (PUSCH) or the physical uplink control channel (PUCCH), and the encoding device 300 may transmit the change (e.g., information indicating the change) n(t) as the encoded CSI on the UL channel to the decoding device 350. Because the change is smaller than an entire CSI instance, the encoding device 300 may send a smaller payload for the encoded CSI on the UL channel, while including more detailed information in the encoded CSI for the change. CSI sequence encoder 320 may generate encoded CSI h(t) based at least in part on the intermediate encoded CSI m(t) and at least a portion of the previously encoded CSI instance h(t−1). CSI sequence encoder 320 may save the encoded CSI h(t) in memory 330.

CSI sequence decoder 360 may receive encoded CSI on the PUSCH or PUCCH. CSI sequence decoder 360 may determine that only the change n(t) of CSI is received as the encoded CSI. CSI sequence decoder 360 may determine an intermediate decoded CSI m(t) based at least in part on the encoded CSI and at least a portion of a previous intermediate decoded CSI instance h(t−1) from memory 370 and the change. CSI instance decoder 380 may decode the intermediate decoded CSI m(t) into decoded CSI. CSI sequence decoder 360 and CSI instance decoder 380 may use neural network decoder weights ϕ. The intermediate decoded CSI may be represented by $[\hat{m}(t), h_{dec}(t)] \triangleq g_{dec,\phi}(n(t), h_{dec}(t-1))$. CSI sequence decoder 360 may generate decoded CSI h(t) based at least in part on the intermediate decoded CSI m(t) and at least a portion of the previously decoded CSI instance h(t−1). The decoding device 350 may reconstruct a DL channel estimate from the decoded CSI h(t), and the reconstructed channel estimate may be represented as H^(t)≜f_(dec, ϕ)(m^(t)). CSI sequence decoder 360 may save the decoded CSI h(t) in memory 370.

Because the change n(t) is smaller than an entire CSI instance, the encoding device 300 may send a smaller payload on the UL channel. For example, if the DL channel has changed little from previous feedback, due to a low Doppler or little movement by the encoding device 300, an output of the CSI sequence encoder may be rather compact. In this way, the encoding device 300 may take advantage of a correlation of channel estimates over time. In some aspects, because the output is small, the encoding device 300 may include more detailed information in the encoded CSI for the change. In some aspects, the encoding device 300 may transmit an indication (e.g., flag) to the decoding device 350 that the encoded CSI is temporally encoded (a CSI change). Alternatively, the encoding device 300 may transmit an indication that the encoded CSI is encoded independently of any previously encoded CSI feedback. The decoding device 350 may decode the encoded CSI without using a previously decoded CSI instance. In some aspects, a device, which may include the encoding device 300 or the decoding device 350, may train a neural network model using a CSI sequence encoder and a CSI sequence decoder.

In some aspects, CSI may be a function of a channel estimate (referred to as a channel response) H and interference N. There may be multiple ways to convey H and N. For example, the encoding device 300 may encode the CSI as $N^{-1/2}H$. The encoding device 300 may encode H and N separately. The encoding device 300 may partially encode H and N separately, and then jointly encode the two partially encoded outputs. Encoding H and N separately maybe advantageous. Interference and channel variations may happen on different time scales. In a low Doppler scenario, a channel may be steady but interference may still change faster due to traffic or scheduler algorithms. In a high Doppler scenario, the channel may change faster than a scheduler-grouping of UEs. In some aspects, a device, which may include the encoding device 300 or the decoding device 350, may train a neural network model using separately encoded H and N.

In some aspects, a reconstructed DL channel $\hat{H}$ may faithfully reflect the DL channel H, and this may be called explicit feedback. In some aspects, $\hat{H}$ may capture only that information required for the decoding device 350 to derive rank and precoding. CQI may be fed back separately. CSI feedback may be expressed as m(t), or as n(t) in a scenario of temporal encoding. Similarly to Type-II CSI feedback, m(t) may be structured to be a concatenation of rank index (RI), beam indices, and coefficients representing amplitudes or phases. In some aspects, m(t) may be a quantized version of a real-valued vector. Beams may be pre-defined (not obtained by training), or may be a part of the training (e.g., part of θ and ϕ and conveyed to the encoding device 300 or the decoding device 350).

In some aspects, the decoding device 350 and the encoding device 300 may maintain multiple encoder and decoder networks, each targeting a different payload size (for varying accuracy vs. UL overhead tradeoff). For each CSI feedback, depending on a reconstruction quality and an uplink budget (e.g., PUSCH payload size), the encoding device 300 may choose, or the decoding device 350 may instruct the encoding device 300 to choose, one of the encoders to construct the encoded CSI. The encoding device 300 may send an index of the encoder along with the CSI based at least in part on an encoder chosen by the encoding device 300. Similarly, the decoding device 350 and the encoding device 300 may maintain multiple encoder and decoder networks to cope with different antenna geometries and channel conditions. Note that while some operations are described for the decoding device 350 and the encoding device 300, these operations may also be performed by another device, as part of a preconfiguration of encoder and decoder weights and/or structures.

As indicated above, FIG. 3 may be provided as an example. Other examples may differ from what is described with regard to FIG. 3.

Figure 4:
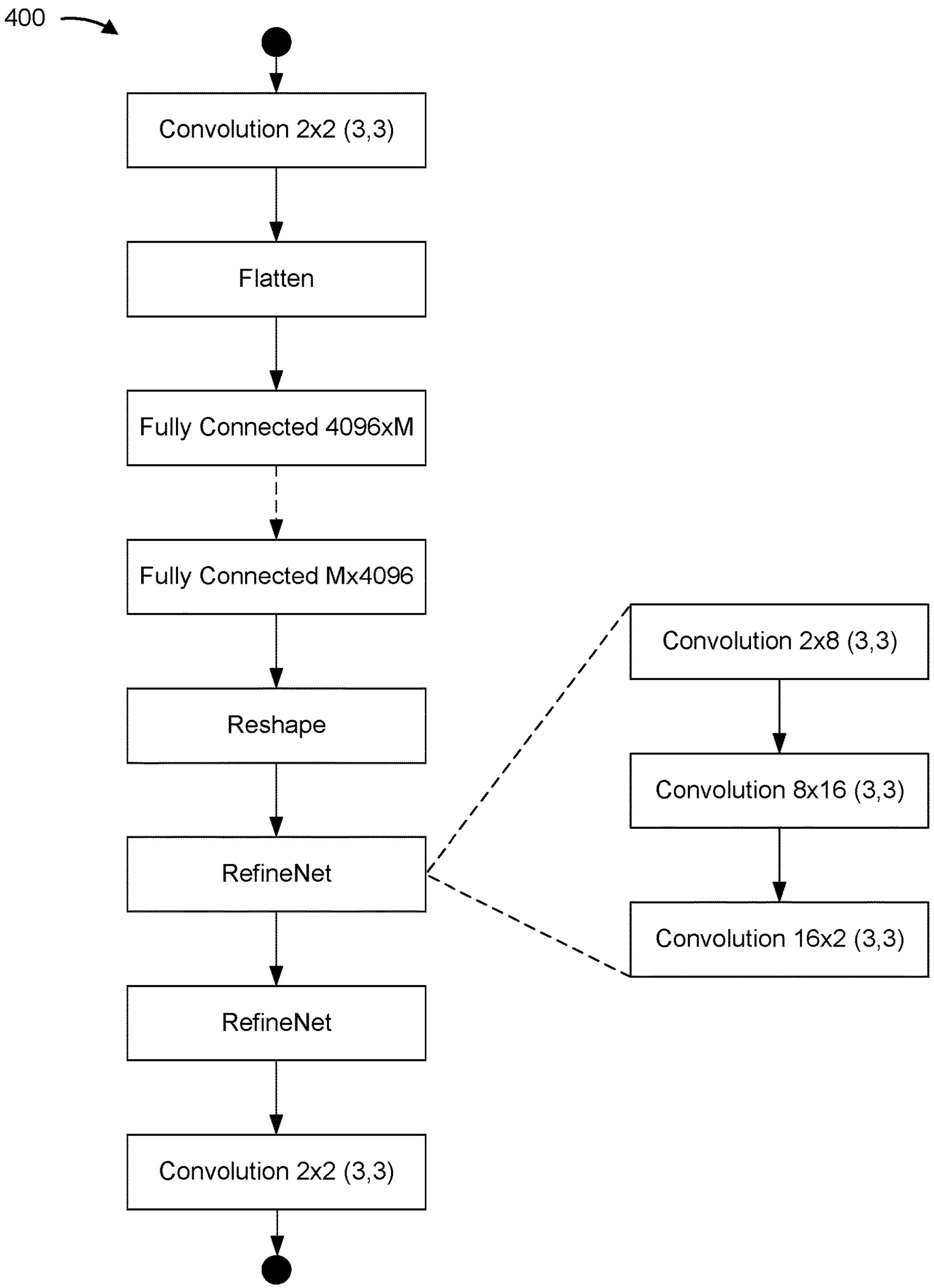
FIG. 4 is a diagram illustrating an example associated with an encoding device and a decoding device, in accordance with the present disclosure.

FIG. 4 is a diagram illustrating an example 400 associated with an encoding device and a decoding device, in accordance with the present disclosure. The encoding device (e.g., UE 120, encoding device 300, and/or the like) may be configured to perform one or more operations on data to compress the data. The decoding device (e.g., base station 110, decoding device 350, and/or the like) may be configured to decode the compressed data to determine information.

As used herein, a "layer" of a neural network is used to denote an operation on input data. For example, a convolution layer, a fully connected layer, and/or the like denote associated operations on data that is input into a layer. A convolution A×B operation refers to an operation that converts a number of input features A into a number of output features B. "Kernel size" refers to a number of adjacent coefficients that are combined in a dimension.

As used herein, "weight" is used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values.

As shown in example 400, the encoding device may perform a convolution operation on samples. For example, the encoding device may receive a set of bits structured as a 2×64×32 data set that indicates IQ sampling for tap features (e.g., associated with multipath timing offsets) and spatial features (e.g., associated with different antennas of the encoding device). The convolution operation may be a 2×2 operation with kernel sizes of 3 and 3 for the data structure. The output of the convolution operation may be input to a batch normalization (BN) layer followed by a LeakyReLU activation, giving an output data set having dimensions 2×64×32. The encoding device may perform a flattening operation to flatten the bits into a 4096 bit vector. The encoding device may apply a fully connected operation, having dimensions 4096×M, to the 4096 bit vector to output a payload of M bits. The encoding device may transmit the payload of M bits to the decoding device.

The decoding device may apply a fully connected operation, having dimensions M×4096, to the M bit payload to output a 4096 bit vector. The decoding device may reshape the 4096 bit vector to have dimension 2×64×32. The decoding device may apply one or more refinement network (RefineNet) operations on the reshaped bit vector. For example, a RefineNet operation may include application of a 2×8 convolution operation (e.g., with kernel sizes of 3 and 3) with output that is input to a BN layer followed by a LeakyReLU activation that produces an output data set having dimensions 8×64×32, application of an 8×16 convolution operation (e.g., with kernel sizes of 3 and 3) with output that is input to a BN layer followed by a LeakyReLU activation that produces an output data set having dimensions 16×64×32, and/or application of a 16×2 convolution operation (e.g., with kernel sizes of 3 and 3) with output that is input to a BN layer followed by a LeakyReLU activation that produces an output data set having dimensions 2×64×32. The decoding device may also apply a 2×2 convolution operation with kernel sizes of 3 and 3 to generate decoded and/or reconstructed output.

As indicated above, FIG. 4 is provided merely as an example. Other examples may differ from what is described with regard to FIG. 4.

As described herein, an encoding device operating in a network may measure reference signals and/or the like to report to a decoding device. For example, a UE may measure reference signals during a beam management process to report channel state information feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like.

In some aspects described herein, an encoding device (e.g., a UE) may train one or more neural networks to learn dependence of measured qualities on individual parameters, isolate the measured qualities through various layers of the one or more neural networks (also referred to as "operations"), and compress measurements in a way that limits compression loss.

In some aspects, the encoding device may use a nature of a quantity of bits being compressed to construct a process of extraction and compression of each feature (also referred to as a dimension) that affects the quantity of bits. In some aspects, the quantity of bits may be associated with sampling of one or more reference signals and/or may indicate channel state information.

Based at least in part on encoding and decoding a data set using a neural network for uplink communication, the encoding device may transmit CSF with a reduced payload. This may conserve network resources that may otherwise have been used to transmit a full data set as sampled by the encoding device.

Figure 5:
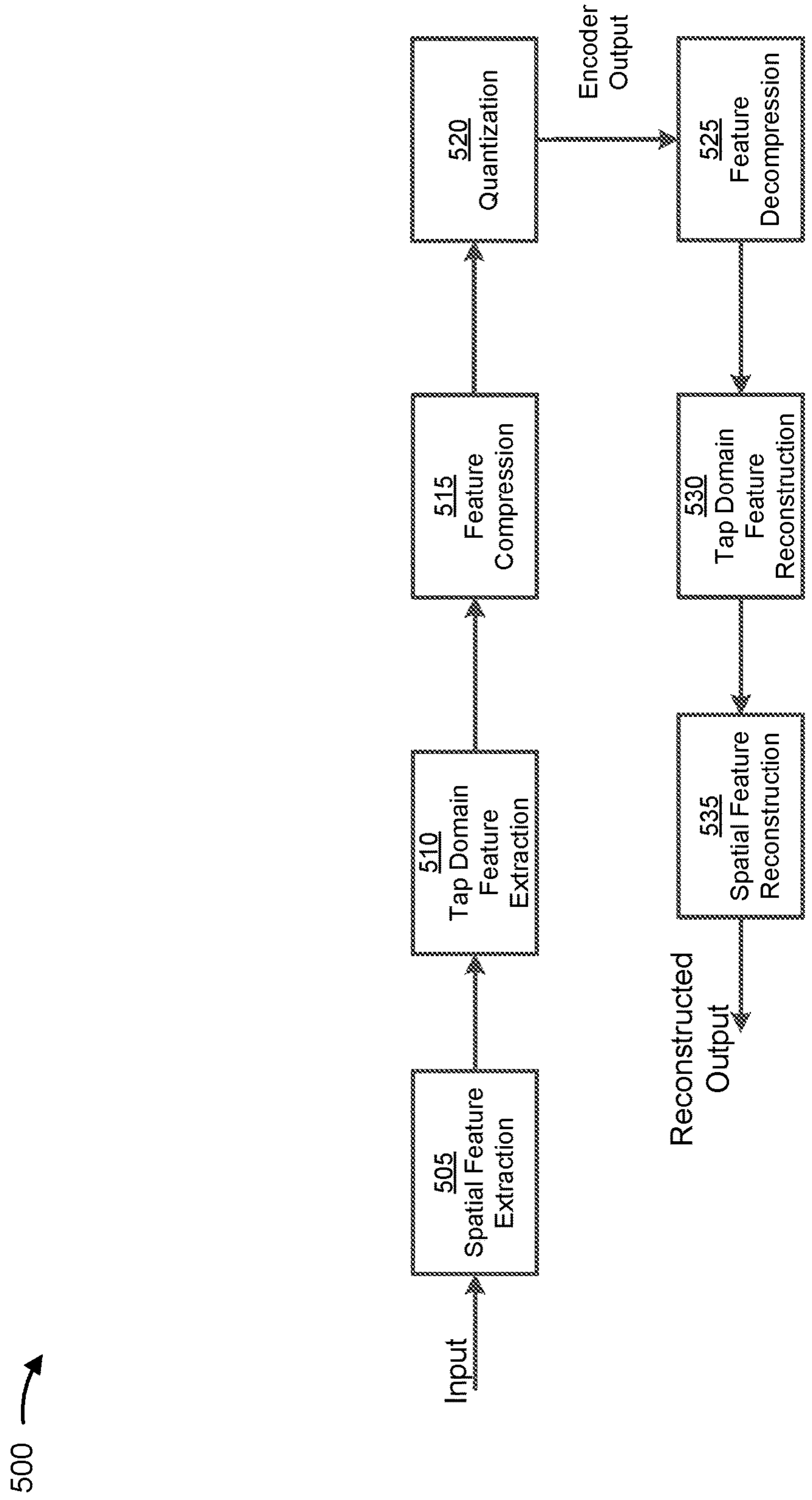
FIGS. 5-8 are diagrams illustrating examples associated with encoding and decoding a data set using a neural network for uplink communication, in accordance with the present disclosure.

FIG. 5 is a diagram illustrating an example 500 associated with encoding and decoding a data set using a neural network for uplink communication, in accordance with the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF.

In some aspects, the encoding device may identify a feature to compress. In some aspects, the encoding device may perform a first type of operation in a first dimension associated with the feature to compress. The encoding device may perform a second type of operation in other dimensions (e.g., in all other dimensions). For example, the encoding device may perform a fully connected operation on the first dimension and convolution (e.g., pointwise convolution) in all other dimensions.

In some aspects, the reference numbers identify operations that include multiple neural network layers and/or operations. Neural networks of the encoding device and the decoding device may be formed by concatenation of one or more of the referenced operations.

As shown by reference number 505, the encoding device may perform a spatial feature extraction on the data. As shown by reference number 510, the encoding device may perform a tap domain feature extraction on the data. In some aspects, the encoding device may perform the tap domain feature extraction before performing the spatial feature extraction. In some aspects, an extraction operation may include multiple operations. For example, the multiple operations may include one or more convolution operations, one or more fully connected operations, and/or the like, that may be activated or inactive. In some aspects, an extraction operation may include a residual neural network (ResNet) operation.

As shown by reference number 515, the encoding device may compress one or more features that have been extracted. In some aspects, a compression operation may include one or more operations, such as one or more convolution operations, one or more fully connected operations, and/or the like. After compression, a bit count of an output may be less than a bit count of an input.

As shown by reference number 520, the encoding device may perform a quantization operation. In some aspects, the encoding device may perform the quantization operation after flattening the output of the compression operation and/or performing a fully connected operation after flattening the output.

As shown by reference number 525, the decoding device may perform a feature decompression. As shown by reference number 530, the decoding device may perform a tap domain feature reconstruction. As shown by reference number 535, the decoding device may perform a spatial feature reconstruction. In some aspects, the decoding device may perform spatial feature reconstruction before performing tap domain feature reconstruction. After the reconstruction operations, the decoding device may output the reconstructed version of the encoding device's input.

In some aspects, the decoding device may perform operations in an order that is opposite to operations performed by the encoding device. For example, if the encoding device follows operations (a, b, c, d), the decoding device may follow inverse operations (D, C, B, A). In some aspects, the decoding device may perform operations that are fully symmetric to operations of the encoding device. This may reduce a number of bits needed for neural network configuration at the UE. In some aspects, the decoding device may perform additional operations (e.g., convolution operations, fully connected operation, ResNet operations, and/or the like) in addition to operations of the encoding device. In some aspects, the decoding device may perform operations that are asymmetric to operations of the encoding device.

Based at least in part on the encoding device encoding a data set using a neural network for uplink communication, the encoding device (e.g., a UE) may transmit CSF with a reduced payload. This may conserve network resources that may otherwise have been used to transmit a full data set as sampled by the encoding device.

As indicated above, FIG. 5 is provided merely as an example. Other examples may differ from what is described with regard to FIG. 5.

Figure 6:
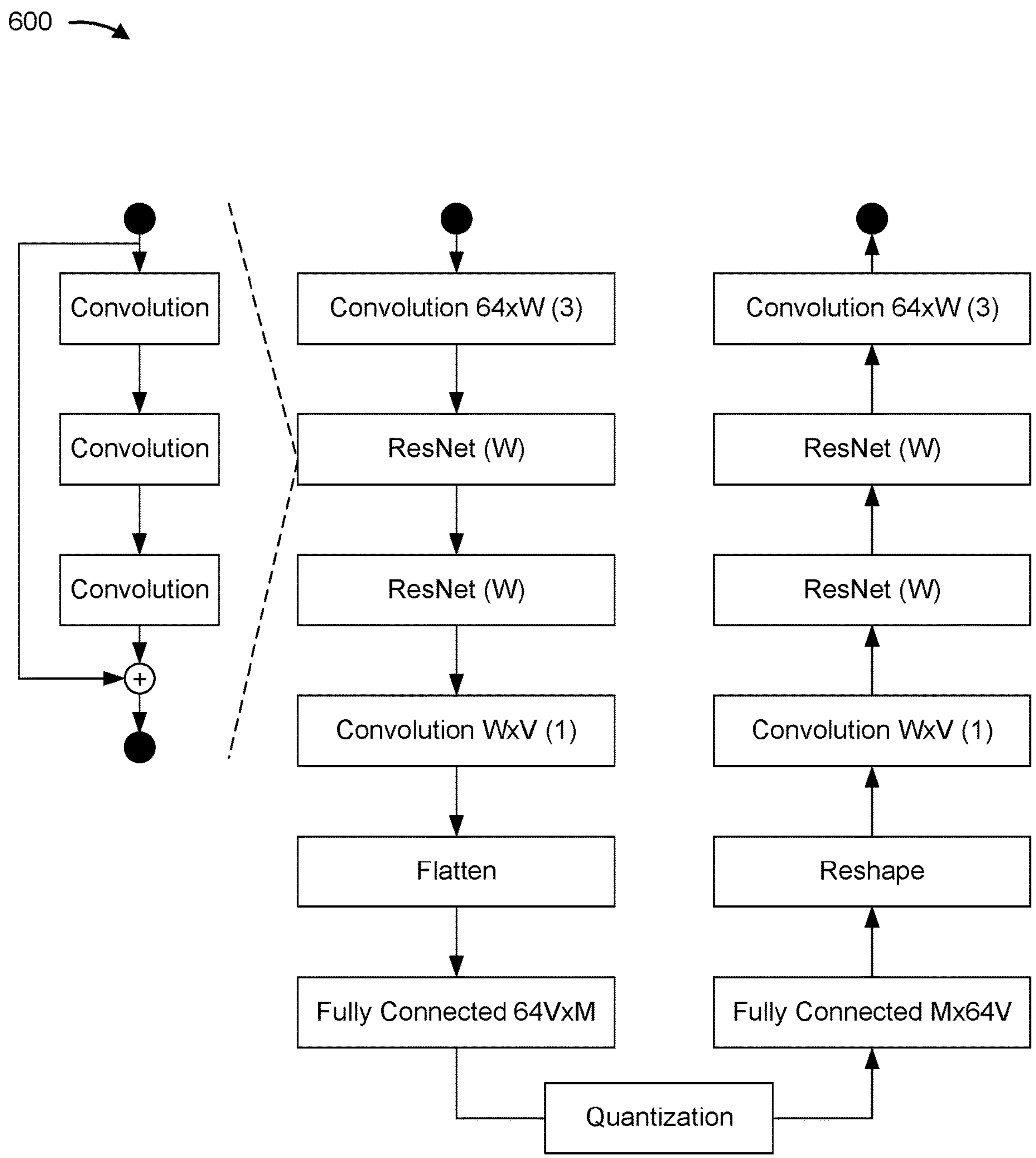

FIG. 6 is a diagram illustrating an example 600 associated with encoding and decoding a data set using a neural network for uplink communication, in accordance with the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF.

As shown by example 600, the encoding device may receive sampling from antennas. For example, the encoding device may receive a 64×64 dimension data set based at least in part on a number of antennas, a number of samples per antenna, and a tap feature.

The encoding device may perform a spatial feature extraction, a short temporal (tap) feature extraction, and/or the like. In some aspects, this may be accomplished through the use of a 1-dimensional convolutional operation, that is fully connected in the spatial dimension (to extract the spatial feature) and simple convolution with a small kernel size (e.g., 3) in the tap dimension (to extract the short tap feature). Output from such a 64×W 1-dimensional convolution operation may be a W×64 matrix.

The encoding device may perform one or more ResNet operations. The one or more ResNet operations may further refine the spatial feature and/or the temporal feature. In some aspects, a ResNet operation may include multiple operations associated with a feature. For example, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensinoal convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The encoding device may perform a W×V convolution operation on output from the one or more ResNet operations. The W×V convolution operation may include a pointwise (e.g., tap-wise) convolution operation. The W×V convolution operation may compress spatial features into a reduced dimension for each tap. The W×V convolution operation has an input of W features and an output of V features. Output from the W×V convolution operation may be a V×64 matrix.

The encoding device may perform a flattening operation to flatten the V×64 matrix into a 64V element vector. The encoding device may perform a 64V×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64V fully connected operation to decompress the low dimension vector of size M into a spatial-temporal feature data set. The decoding device may perform a reshaping operation to reshape the 64V element vector into a 2-dimensional V×64 matrix. The decoding device may perform a V×W (with kernel of 1) convolution operation on output from the reshaping operation. The V×W convolution operation may include a pointwise (e.g., tap-wise) convolution operation. The V×W convolution operation may decompress spatial features from a reduced dimension for each tap. The V×W convolution operation has an input of V features and an output of W features. Output from the V×W convolution operation may be a W×64 matrix.

The decoding device may perform one or more ResNet operations. The one or more ResNet operations may further decompress the spatial feature and/or the temporal feature. In some aspects, a ResNet operation may include multiple (e.g., 3) 1-dimensional convolution operations, a skip connection (e.g., to avoid application of the 1-dimensional convolution operations), a summation operation of a path through the multiple convolution operations and a path through the skip connection, and/or the like. Output from the one or more ResNet operations may be a W×64 matrix.

The decoding device may perform a spatial and temporal feature reconstruction. In some aspects, this may be accomplished through the use of a 1-dimensional convolutional operation that is fully connected in the spatial dimension (to reconstruct the spatial feature) and simple convolution with a small kernel size (e.g., 3) in the tap dimension (to reconstruct the short tap feature). Output from the 64×W convolution operation may be a 64×64 matrix.

In some aspects, values of M, W, and/or V may be configurable to adjust weights of the features, payload size, and/or the like.

As indicated above, FIG. 6 is provided merely as an example. Other examples may differ from what is described with regard to FIG. 6.

Figure 7:
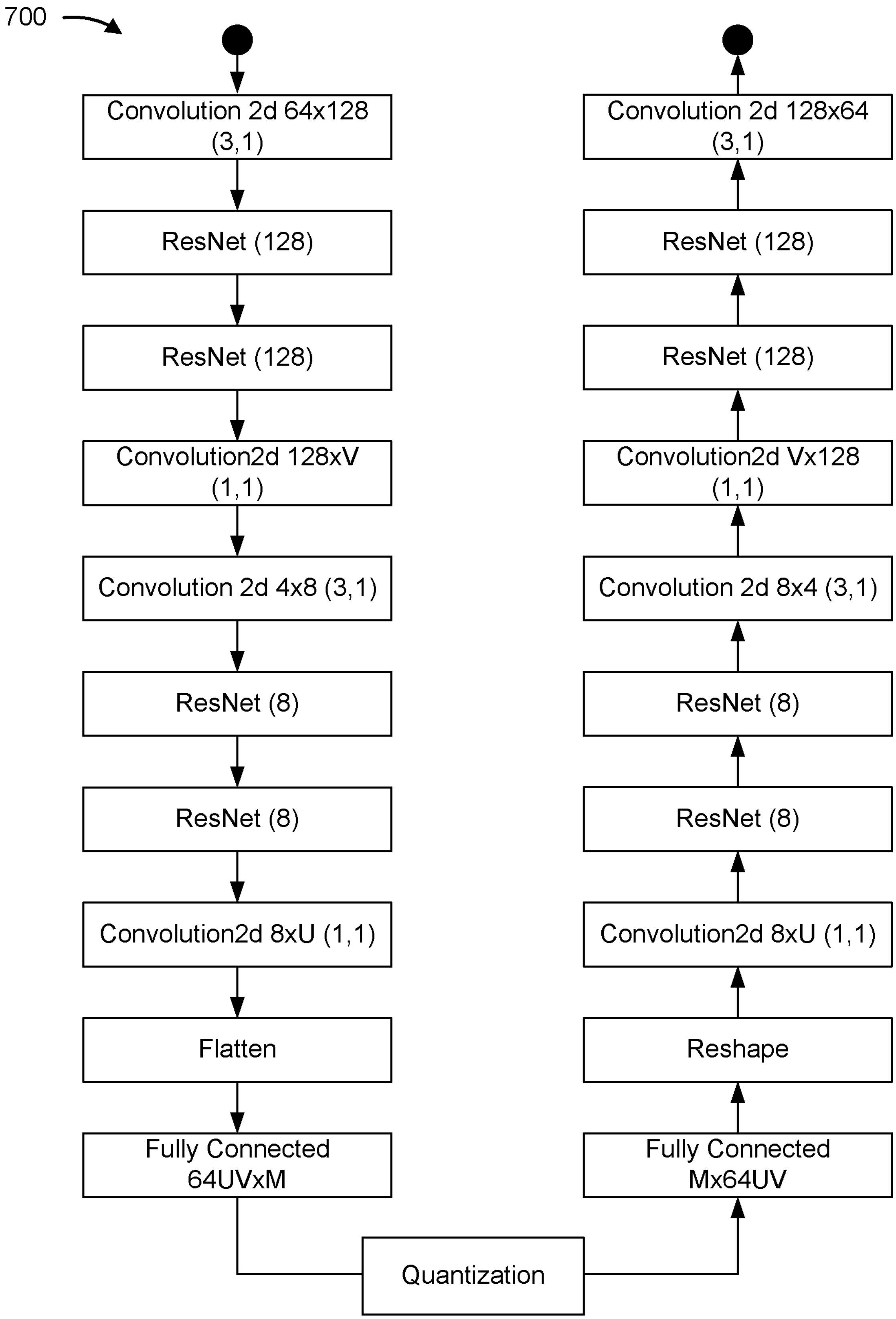

FIG. 7 is a diagram illustrating an example 700 associated with encoding and decoding a data set using a neural network for uplink communication, in accordance with the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF. As shown by example 700, features may be compressed and decompressed in sequence. For example, the encoding device may extract and compress features associated with the input to produce a payload, and then the decoding device may extract and compress features associated with the payload to reconstruct the input. The encoding and decoding operations may be symmetric (as shown) or asymmetric.

As shown by example 700, the encoding device may receive sampling from antennas. For example, the encoding device may receive a 256×64 dimension data set based at least in part on a number of antennas, a number of samples per antenna, and a tap feature. The encoding device may reshape the data to a (64×64×4) data set.

The encoding device may perform a 2-dimensional 64×128 convolution operation (with kernel sizes of 3 and 1). In some aspects, the 64×128 convolution operation may perform a spatial feature extraction associated with the decoding device antenna dimension, a short temporal (tap) feature extraction associated with the decoding device (e.g., base station) antenna dimension, and/or the like. In some aspects, this may be accomplished through the use of a 2D convolutional layer that is fully connected in a decoding device antenna dimension, a simple convolutional operation with a small kernel size (e.g., 3) in the tap dimension and a small kernel size (e.g., 1) in the encoding device antenna dimension. Output from the 64xW convolution operation may be a (128×64×4) dimension matrix.

The encoding device may perform one or more ResNet operations. The one or more ResNet operations may further refine the spatial feature associated with the decoding device and/or the temporal feature associated with the decoding device. In some aspects, a ResNet operation may include multiple operations associated with a feature. For example, a ResNet operation may include multiple (e.g., 3) 2-dimensional convolution operations, a skip connection (e.g., between input of the ResNet and output of the ResNet to avoid application of the 2-dimensional convolution operations), a summation operation of a path through the multiple 2-dimensional convolution operations and a path through the skip connection, and/or the like. In some aspects, the multiple 2-dimensional convolution operations may include a W×2W convolution operation with kernel sizes 3 and 1 with output that is input to a BN layer followed by a LeakyReLU activation that produces an output data set of dimension 2W×64×V, a 2W×4W convolution operation with kernel sizes 3 and 1 with output that is input to a BN layer followed by a LeakyReLU activation that produces an output data set of dimension 4W×64×V, and 4W×W convolution operation with kernel sizes 3 and 1 that outputs a BN data set of dimension (128×64×4). Output from the one or more ResNet operations may be a (128×64×4) dimension matrix.

The encoding device may perform a 2-dimensional 128×V convolution operation (with kernel sizes of 1 and 1) on output from the one or more ResNet operations. The 128×V convolution operation may include a pointwise (e.g., tap-wise) convolution operation. The W×V convolution operation may compress spatial features associated with the decoding device into a reduced dimension for each tap. Output from the 128×V convolution operation may be a (4×64×V) dimension matrix.

The encoding device may perform a 2-dimensional 4×8 convolution operation (with kernel sizes of 3 and 1). In some aspects, the 4×8 convolution operation may perform a spatial feature extraction associated with the encoding device antenna dimension, a short temporal (tap) feature extraction associated with the encoding device antenna dimension, and/or the like. Output from the 4×8 convolution operation may be a (8×64×V) dimension matrix.

The encoding device may perform one or more ResNet operations. The one or more ResNet operations may further refine the spatial feature associated with the encoding device and/or the temporal feature associated with the encoding device. In some aspects, a ResNet operation may include multiple operations associated with a feature. For example, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension matrix.

The encoding device may perform a 2-dimensional 8×U convolution operation (with kernel sizes of 1 and 1) on output from the one or more ResNet operations. The 8×U convolution operation may include a pointwise (e.g., tap-wise) convolution operation. The 8×U convolution operation may compress spatial features associated with the decoding device into a reduced dimension for each tap. Output from the 128×V convolution operation may be a (U×64×V) dimension matrix.

The encoding device may perform a flattening operation to flatten the (U×64×V) dimension matrix into a 64UV element vector. The encoding device may perform a 64UV×M fully connected operation to further compress a 2-dimentional spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform an M×64UV fully connected operation to decompress the low dimension vector of size M into a spatial-temporal feature data set. The decoding device may perform a reshaping operation to reshape the 64UV element vector into a (U×64×V) dimensional matrix. The decoding device may perform a 2-dimensional U×8 (with kernel of 1, 1) convolution operation on output from the reshaping operation. The U×8 convolution operation may include a pointwise (e.g., tap-wise) convolution operation. The U×8 convolution operation may decompress spatial features from a reduced dimension for each tap. Output from the U×8 convolution operation may be a (8×64×V) dimension data set.

The decoding device may perform one or more ResNet operations. The one or more ResNet operations may further decompress the spatial feature and/or the temporal feature associated with the encoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (8×64×V) dimension data set.

The decoding device may perform a 2-dimensional 8×4 convolution operation (with kernel sizes of 3 and 1). In some aspects, the 8×4 convolution operation may perform a spatial feature reconstruction in the encoding device antenna dimension, and a short temporal feature reconstruction, and/or the like. Output from the 8×4 convolution operation may be a (V×64×4) dimension data set.

The decoding device may perform a 2-dimensional V×128 (with kernel of 1) convolution operation on output from the 2-dimensional 8×4 convolution operation to reconstruct a tap feature and a spatial feature associated with the decoding device. The V×128 convolution operation may include a pointwise (e.g., tap-wise) convolution operation. The V×128 convolution operation may decompress spatial features associated with the decoding device antennas from a reduced dimension for each tap. Output from the U×8 convolution operation may be a (128×64×4) dimension matrix.

The decoding device may perform one or more ResNet operations. The one or more ResNet operations may further decompress the spatial feature and/or the temporal feature associated with the decoding device. In some aspects, a ResNet operation may include multiple (e.g., 3) 2-dimensional convolution operations, a skip connection (e.g., to avoid application of the 2-dimensional convolution operations), a summation operation of a path through the multiple 2-dimensional convolution operations and a path through the skip connection, and/or the like. Output from the one or more ResNet operations may be a (128×64×4) dimension matrix.

The decoding device may perform a 2-dimensional 128×64 convolution operation (with kernel sizes of 3 and 1). In some aspects, the 128×64 convolution operation may perform a spatial feature reconstruction associated with the decoding device antenna dimension, a short temporal feature reconstruction, and/or the like. Output from the 128×64 convolution operation may be a (64×64×4) dimension data set.

In some aspects, values of M, V, and/or U may be configurable to adjust weights of the features, payload size, and/or the like. For example, a value of M may be 32, 64, 128, 256, or 512, a value of V may be 16, and/or a value of U may be 1.

As indicated above, FIG. 7 is provided merely as an example. Other examples may differ from what is described with regard to FIG. 7.

Figure 8:
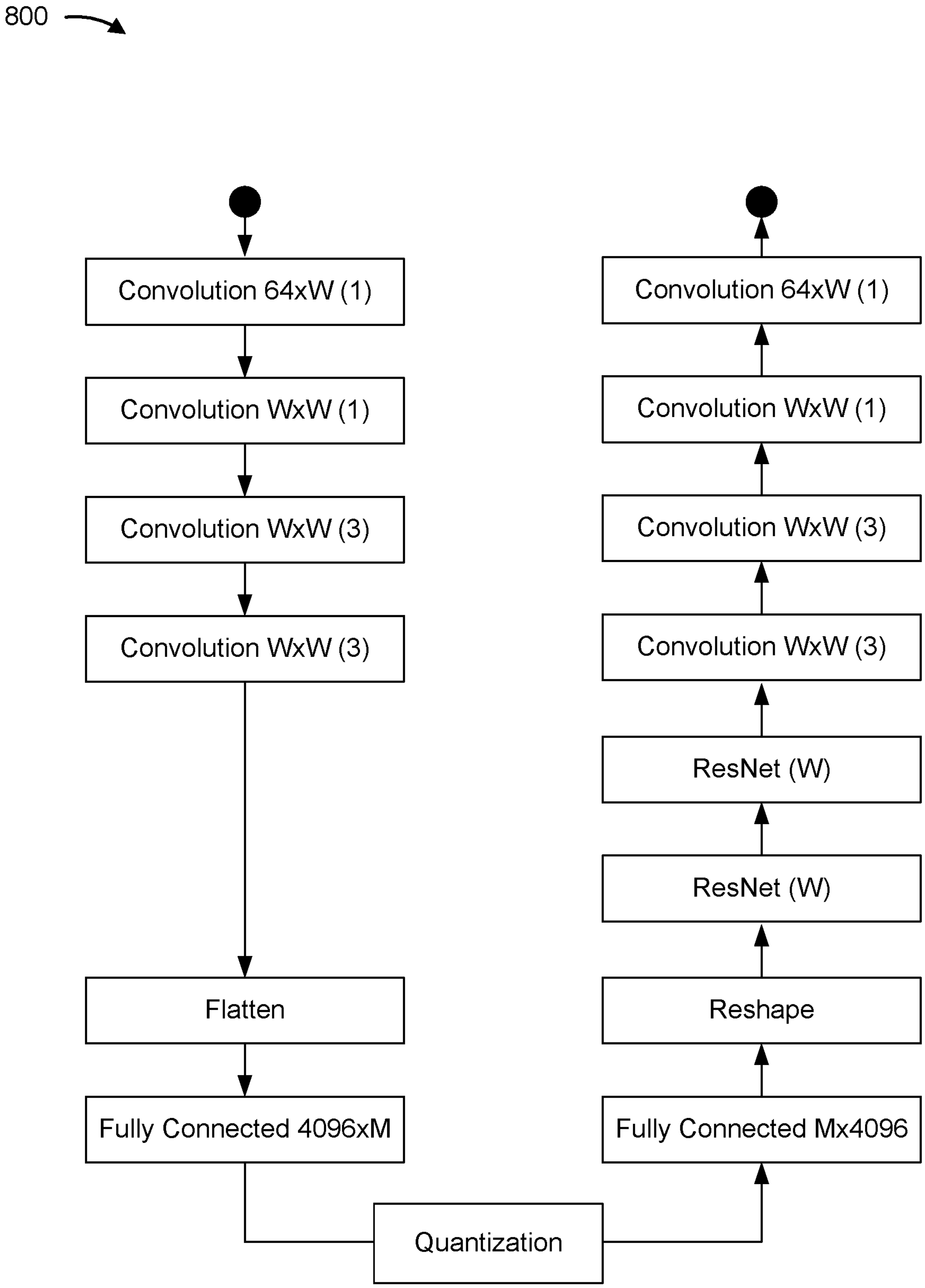

FIG. 8 is a diagram illustrating an example 800 associated with encoding and decoding a data set using a neural network for uplink communication, in accordance with the present disclosure. An encoding device (e.g., UE 120, encoding device 300, and/or the like) may be configured to perform one or more operations on samples (e.g., data) received via one or more antennas of the encoding device to compress the samples. A decoding device (e.g., base station 110, decoding device 350, and/or the like) may be configured to decode the compressed samples to determine information, such as CSF. The encoding device and decoding device operations may be asymmetric. In other words, the decoding device may have a greater number of layers than the decoding device.

As shown by example 800, the encoding device may receive sampling from antennas. For example, the encoding device may receive a 64×64 dimension data set based at least in part on a number of antennas, a number of samples per antenna, and a tap feature.

The encoding device may perform a 64×W convolution operation (with a kernel size of 1). In some aspects, the 64×W convolution operation may be fully connected in antennas, convolution in taps, and/or the like. Output from the 64×W convolution operation may be a W×64 matrix. The encoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the one or more W×W convolution operations may perform a spatial feature extraction, a short temporal (tap) feature extraction, and/or the like. In some aspects, the W×W convolution operations may be a series of 1-dimensional convolution operations.

The encoding device may perform a flattening operation to flatten the W×64 matrix into a 64W element vector. The encoding device may perform a 4096×M fully connected operation to further compress the spatial-temporal feature data set into a low dimension vector of size M for transmission over the air to the decoding device. The encoding device may perform quantization before the over the air transmission of the low dimension vector of size M to map sampling of the transmission into discrete values for the low dimension vector of size M.

The decoding device may perform a 4096×M fully connected operation to decompress the low dimension vector of size M into a spatial-temporal feature data set. The decoding device may perform a reshaping operation to reshape the 6W element vector into a W×64 matrix.

The decoding device may perform one or more ResNet operations. The one or more ResNet operations may decompress the spatial feature and/or the temporal feature. In some aspects, a ResNet operation may include multiple (e.g., 3) 1-dimensional convolution operations, a skip connection (e.g., between input of the ResNet and output of the ResNet to avoid application of the 1-dimensional convolution operations), a summation operation of a path through the multiple 1-dimensional convolution operations and a path through the skip connection, and/or the like. In some aspects, the multiple 1-dimensinoal convolution operations may include a W×256 convolution operation with kernel size 3 with output that is input to a BN layer followed by a LeakyReLU activation that produces an output data set of dimension 256×64, a 256×512 convolution operation with kernel size 3 with output that is input to a BN layer followed by a LeakyReLU activation that produces an output data set of dimension 512×64, and 512×W convolution operation with kernel size 3 that outputs a BN data set of dimension W×64. Output from the one or more ResNet operations may be a W×64 matrix.

The decoding device may perform one or more W×W convolution operations (with a kernel size of 1 or 3). Output from the one or more W×W convolution operations may be a W×64 matrix. The encoding device may perform the convolution operations (with a kernel size of 1). In some aspects, the W×W convolution operations may perform a spatial feature reconstruction, a short temporal (tap) feature reconstruction, and/or the like. In some aspects, the W×W convolution operations may be a series of 1-dimensional convolution operations.

The encoding device may perform a W×64 convolution operation (with a kernel size of 1). In some aspects, the W×64 convolution operation may be a 1-dimensional convolution operation. Output from the 64×W convolution operation may be a 64×64 matrix.

In some aspects, values of M, and/or W may be configurable to adjust weights of the features, payload size, and/or the like.

As indicated above, FIG. 8 is provided merely as an example. Other examples may differ from what is described with regard to FIG. 8.

As described herein, an encoding device operating in a network may measure reference signals and/or the like to report to a decoding device. For example, an encoding device may receive a neural network based channel state information (CSI) reference signal (CSI-RS). The encoding device may measure neural network based CSI based at least in part on the CSI-RS. In some aspects, neural network based CSI may compress the channel information associated with the CSI-RS in a more comprehensive form than, for example, non-neural network based Type-II CSI or Type-I CSI. For example, in Type-II CSI, the sub-band size may be fixed for all sub-bands, which may result in limited granularity. Neural network based CSI may facilitate greater granularity by facilitating providing information regarding an entire channel. Neural network based CSI also may be specified to compress certain sub-bands with greater accuracy or less accuracy.

In some aspects, neural network based CSI also may facilitate multiple user (MU) multiple input multiple output (MU-MIMO) operation at a decoding device, by facilitating providing information about a channel and interference, thereby enabling the decoding device to manage and group users, and/or the like. Machine-learning based reporting of CSF may facilitate the use of Type III CSI. However, different encoding devices may have different capabilities for training and/or implementing neural networks for encoding CSF. As a result, configuring encoding devices with a uniform neural network or system of neural networks may result in differing levels of performance and/or workability with regard to different encoding devices.

According to aspects of the techniques and apparatuses described herein, an encoding device may be configured with one or more neural networks based at least in part on a capability of the encoding device. In some aspects, an encoding device may transmit a neural network capability indication that indicates a capability of the encoding device associated with training at least one CSF neural network for facilitating providing CSF. A decoding device may receive the capability indication and may determine a CSF neural network configuration based at least in part on the capability indication. The decoding device may transmit the CSF neural network configuration to the encoding device. In this way, differences in capabilities of encoding devices may be taken into account during configuration of neural networks. As a result, neural networks may be configured so as to maximize the capabilities of an encoding device and decoding devices may be able to better predict performance levels and manage neural network updates, and/or the like.

Figure 9:
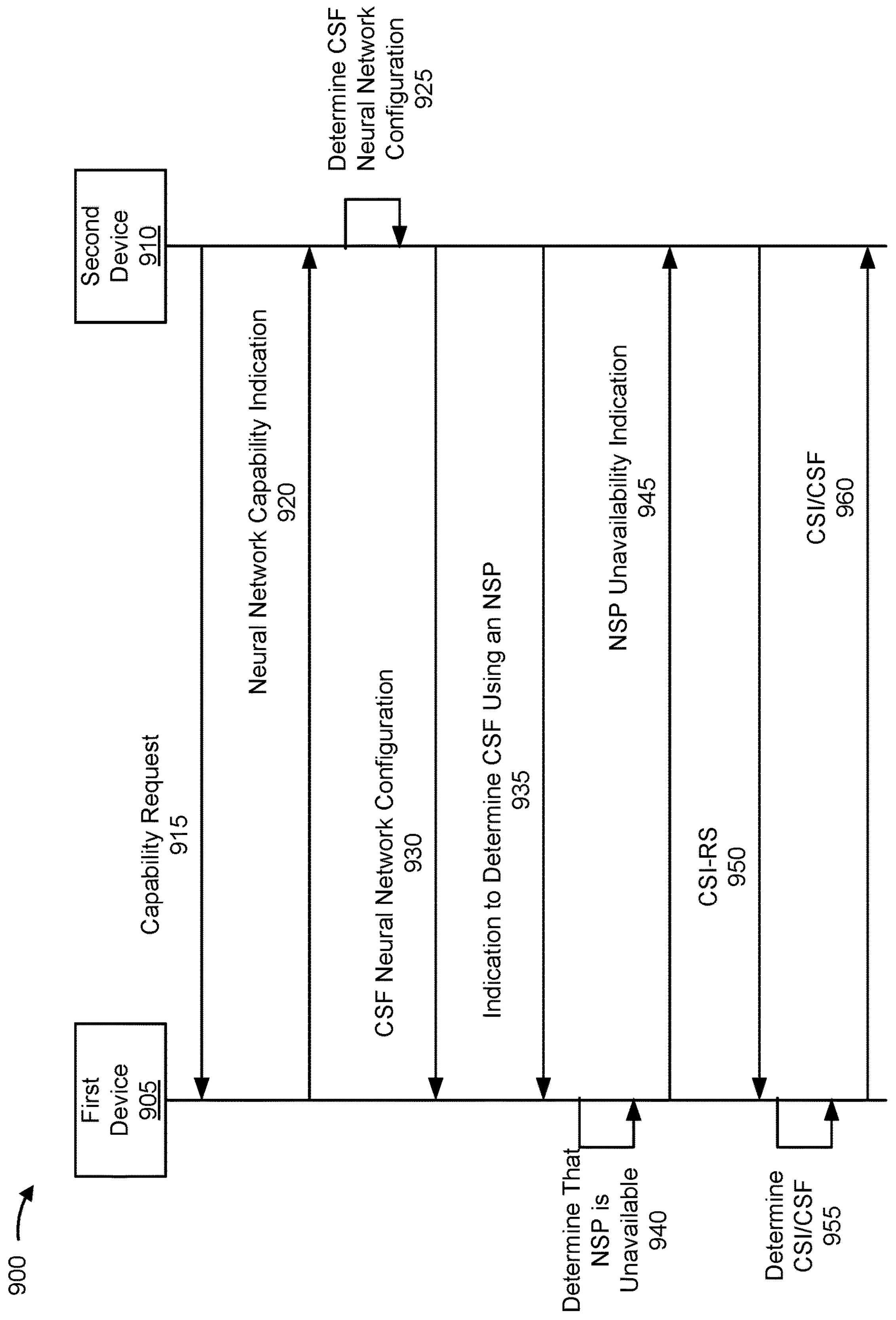
FIG. 9 is a diagram illustrating an example associated with configuration of a first device, based on a first device capability, for encoding channel state feedback (CSF) using a neural network, in accordance with the present disclosure.

FIG. 9 is a diagram illustrating an example associated with configuration of a first device (e.g., an encoding device), based on a first device capability, for encoding CSF using a neural network, in accordance with the present disclosure. As shown, a first device 905 and a second device 910 may communicate with one another. In some aspects, the first device 905 and the second device 910 may communicate via a wireless communication network (e.g., wireless network 100 shown in FIG. 1). The first device 905 may be an encoding device (e.g., UE 120, encoding device 300, and/or the like) and the second device 910 may be a decoding device (e.g., base station 110, decoding device 350, and/or the like).

As shown by reference number 915, the second device 910 may transmit, and the first device 905 may receive, a capability request. In some aspects, the capability request may be carried in a radio resource control (RRC) message, an RRC channel state information message, a medium access control (MAC) control element (MAC-CE), downlink control information (DCI), and/or the like. In some aspects, the capability request may be carried in a group message addressed to at least one additional first device. For example, a second device 910 may transmit a group message to a group of selected first devices 905, broadcast a group message to any first device 905 that may receive the broadcast message, and/or the like.

As shown by reference number 920, the first device 905 may transmit, and the second device 910 may receive, a neural network capability indication. The neural network capability indication may indicate a capability of the first device 905 associated with training at least one CSF neural network for facilitating providing CSF. A CSF neural network may facilitate providing CSF by providing at least one aspect of a technique, mechanism, function, operation, and/or the like that alone, or in combination with one or more other aspects, enables and/or causes a device to provide CSF. In some aspects, the first device 905 may transmit the neural network capability indication based at least in part on receiving the capability request.

The capability of the first device 905 may be based at least in part on an amount of available memory of the first device 905. In some aspects, the amount of available memory may correspond to at least one bandwidth. In some aspects, the neural network capability indication may indicate a number of neural signal processors (NSPs) available on the first device 905.

In some aspects, the neural network capability indication may indicate at least one neural network complexity parameter corresponding to a neural network complexity that can be supported by the first device 905. The at least one complexity parameter may indicate a number of layers associated with the at least one CSF neural network, a number of layers corresponding to a bandwidth part (BWP) associated with the at least one CSF neural network, a layer characteristic associated with the at least one CSF neural network, a non-linear activation function associated with the at least one CSF neural network, a time dependency capturing type associated with the at least one CSF neural network (such as, for example, recurrent neural networks, and/or their extensions such as, but not limited to, gated recursive units (GRUs), long short term memory (LSTM) modules, and/or the like), a number of stackable layers of time dependencies associated with the at least one CSF neural network, a maximum layer size associated with the at least one CSF neural network, a maximum size of a hidden state in a time dependency layer associated with the at least one CSF neural network, a maximum size of a cell state in a time dependency layer associated with the at least one CSF neural network, a number of delay taps to be used for channel compression, a tap energy pruning criterion, and/or the like.

In some aspects, for example, the layer characteristic may indicate a fully-connected layer type, a convolutional layer type, a kernel size, a weight precision value, an activation function, and/or the like. Any number of the complexity parameters may be expressed in terms of other complexity parameters, other capability parameters, and/or the like. For example, in some aspects, the capability indication may indicate the types of layers that may be stacked, the maximum size of each of a number of types of layers that may be supported, the maximum hidden and/or cell size states associated with different types of layers, and/or the like.

As shown by reference number 925, the second device 910 may determine a CSF neural network configuration associated with the first device 905. In some aspects, the second device 910 may determine the CSF neural network configuration based at least in part on the capability indication. As shown by reference number 930, the second device 910 may transmit, and the first device 905 may receive, a CSF neural network configuration. The CSF neural network configuration may indicate at least one parameter associated with the at least one CSF neural network.

The at least one parameter may indicate a number of CSF neural networks to be configured. The at least one CSF neural network may include a plurality of CSF neural networks. In some aspects, the at least one parameter may indicate a plurality of bandwidths corresponding to a plurality of CSF neural networks, a plurality of BWPs corresponding to the plurality of CSF neural networks, a plurality of resources corresponding to the plurality of CSF neural networks, a plurality of frequency ranges corresponding to the plurality of CSF neural networks, a plurality of component carriers corresponding to the plurality of CSF neural networks, a plurality of radio access network (RAN) modes corresponding to the plurality of CSF neural networks, and/or the like.

In some aspects, the at least one parameter may indicate a first CSF neural network of the plurality of CSF neural networks corresponding to a first bandwidth of the plurality of bandwidths and a second CSF neural network of the plurality of CSF neural networks corresponding to a second bandwidth of the plurality of bandwidths. In some aspects, the at least one parameter may indicate more than one neural network corresponding to a first bandwidth and/or more than one neural network corresponding to a second bandwidth. In some aspects, the at least one parameter may indicate any number of neural networks corresponding to any number of bandwidths.

In some aspects, the at least one parameter may indicate a first CSF neural network of the plurality of CSF neural networks corresponding to a first BWP of a plurality of BWPs and a second CSF neural network of the plurality of CSF neural networks corresponding to a second BWP of the plurality of BWPs. In some aspects, the at least one parameter may indicate more than one neural network corresponding to a first BWP and/or more than one neural network corresponding to a second BWP. In some aspects, the at least one parameter may indicate any number of neural networks corresponding to any number of BWPs.

In some aspects, the at least one parameter may indicate a first CSF neural network of the plurality of CSF neural networks corresponding to a first resource of a plurality of resources and a second CSF neural network of the plurality of CSF neural networks corresponding to a second resource of the plurality of resources. In some aspects, the at least one parameter may indicate more than one neural network corresponding to a first resource and/or more than one neural network corresponding to a second resource. In some aspects, the at least one parameter may indicate any number of neural networks corresponding to any number of resources.

In some aspects, the at least one parameter may indicate a first CSF neural network of the plurality of CSF neural networks corresponding to a first frequency range of a plurality of frequency ranges and a second CSF neural network of the plurality of CSF neural networks corresponding to a second frequency range of the plurality of frequency ranges. In some aspects, the at least one parameter may indicate more than one neural network corresponding to a first frequency range and/or more than one neural network corresponding to a second frequency range. In some aspects, the at least one parameter may indicate any number of neural networks corresponding to any number of frequency ranges. In some aspects, for example, the first frequency range may include a sub-6 gigahertz frequency range (e.g., FR1) and the second frequency range may include a millimeter wave frequency range (e.g., FR2).

In some aspects, the at least one parameter may indicate a first CSF neural network of the plurality of CSF neural networks corresponding to a first component carrier of a plurality of component carriers and a second CSF neural network of the plurality of CSF neural networks corresponding to a second component carrier of the plurality of component carriers. In some aspects, the at least one parameter may indicate more than one neural network corresponding to a first component carrier and/or more than one neural network corresponding to a second component carrier. In some aspects, the at least one parameter may indicate any number of neural networks corresponding to any number of component carriers.

In some aspects, the at least one parameter may indicate a first CSF neural network of the plurality of CSF neural networks corresponding to a first RAN mode of a plurality of RAN modes and a second CSF neural network of the plurality of CSF neural networks corresponding to a second RAN mode of the plurality of RAN modes. In some aspects, the at least one parameter may indicate more than one neural network corresponding to a first RAN mode and/or more than one neural network corresponding to a second RAN mode. In some aspects, the at least one parameter may indicate any number of neural networks corresponding to any number of RAN modes.

In some aspects, the CSF neural network configuration may be carried in a group message addressed to at least one additional first device 905. The at least one parameter may indicate one or more parameters that may be common among a number of first devices 905. For example, in some aspects, the at least one parameter may indicate a number of delay taps to be used for channel compression, a tap energy pruning criterion, and/or the like.

In some aspects, the CSF neural network configuration may further indicates a neural network based CSI-RS. As shown by reference number 935, in some aspects, the second device 910 may transmit, and the first device 905 may receive, an indication to determine the CSF (based at least in part on a neural network based CSI-RS) using an NSP. In some aspects, the indication to determine the CSF using an NSP may be carried in DCI, a MAC-CE, and/or the like.

As shown by reference number 940, the first device 905 may determine that the NSP (or NSPs) is unavailable. In some aspects, NSPs may be shared by multi-media subsystems, processor subsystems, and/or the like. The first device 905 may determine that an NSP is unavailable by determining that the NSP is performing a task and determining that a priority level associated with the task is higher than a priority level associated with determining the CSF. In some aspects, the first device 905 may determine that the NSP is unavailable at a first time, but that the NSP will be available at a second time.

As shown by reference number 945, the first device 905 may transmit, and the second device 910 may receive, an unavailability indication. The first device 905 may transmit the unavailability indication based at least in part on determining that the NSP is unavailable. In some aspects, the unavailability indication may be carried in at least one of uplink control information (UCI), an uplink MAC-CE, or a combination thereof.

As shown by reference number 950, the second device 910 may transmit, and the first device 905 may receive, a CSI-RS. As shown by reference number 955, the first device 905 may determine CSI and/or CSF based on the CSI. In some aspects, for example, the first device 905 may compute Type-I CSI and/or Type-II CSI based at least in part on determining that the NSP is unavailable. In some aspects, the first device 905 may delay the feedback of neural network based CSF until the NSP becomes available. As shown by reference number 960, the first device 905 may transmit, and the second device 910 may receive, the Type-I CSI, the Type-II CSI, the neural network based CSF, and/or the like.

As indicated above, FIG. 9 is provided merely as an example. Other examples may differ from what is described with regard to FIG. 9.

Figure 10:
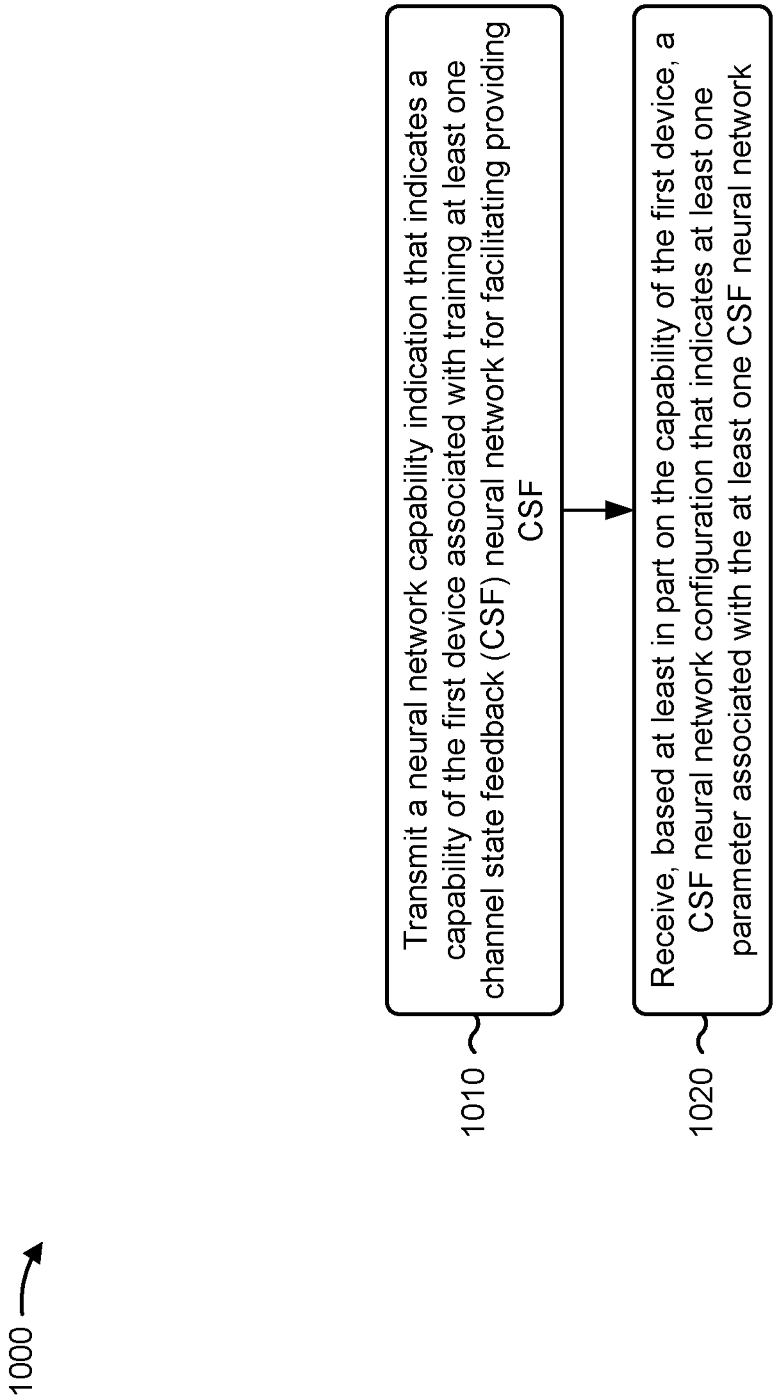
FIGS. 10 and 11 are diagrams illustrating example processes associated with configuration of a first device, based on a first device capability, for encoding CSF using a neural network, in accordance with the present disclosure.

FIG. 10 is a diagram illustrating an example process 1000 performed, for example, by a first device, in accordance with the present disclosure. Example process 1000 is an example where the first device (e.g., first device 905 shown in FIG. 9, encoding device 300 shown in FIG. 3, UE 120 shown in FIG. 1, and/or the like) performs operations associated with capability and configuration of a device for providing CSF feedback.

As shown in FIG. 10, in some aspects, process 1000 may include transmitting a neural network capability indication that indicates a capability of the first device associated with training at least one CSF neural network for facilitating providing CSF (block 1010). For example, the first device (e.g., using transmission component 1206 of FIG. 12) may transmit a neural network capability indication that indicates a capability of the first device associated with training at least one CSF neural network for facilitating providing CSF, as described above.

As further shown in FIG. 10, in some aspects, process 1000 may include receiving, based at least in part on the capability of the first device, a CSF neural network configuration that indicates at least one parameter associated with the at least one CSF neural network (block 1020). For example, the first device (e.g., using reception component 1202 of FIG. 12) may receive, based at least in part on the capability of the first device, a CSF neural network configuration that indicates at least one parameter associated with the at least one CSF neural network, as described above.

Process 1000 may include additional aspects, such as any single aspect or any combination of aspects described below and/or in connection with one or more other processes described elsewhere herein.

In a first aspect, the at least one parameter indicates a number of CSF neural networks to be configured.

In a second aspect, alone or in combination with the first aspect, the at least one CSF neural network comprises a plurality of CSF neural networks.

In a third aspect, alone or in combination with one or more of the first and second aspects, the at least one parameter indicates at least one of a plurality of bandwidths corresponding to a plurality of CSF neural networks, a plurality of bandwidth parts corresponding to the plurality of CSF neural networks, a plurality of resources corresponding to the plurality of CSF neural networks, a plurality of frequency ranges corresponding to the plurality of CSF neural networks, a plurality of component carriers corresponding to the plurality of CSF neural networks, a plurality of RAN modes corresponding to the plurality of CSF neural networks, or a combination thereof.

In a fourth aspect, alone or in combination with one or more of the first through third aspects, the at least one parameter indicates a first CSF neural network of the plurality of CSF neural networks corresponding to a first bandwidth of the plurality of bandwidths, and a second CSF neural network of the plurality of CSF neural networks corresponding to a second bandwidth of the plurality of bandwidths.

In a fifth aspect, alone or in combination with one or more of the first through fourth aspects, the at least one parameter indicates a first CSF neural network of the plurality of CSF neural networks corresponding to a first BWP of the plurality of bandwidth parts, and a second CSF neural network of the plurality of CSF neural networks corresponding to a second BWP of the plurality of BWPs.

In a sixth aspect, alone or in combination with one or more of the first through fifth aspects, the at least one parameter indicates a first CSF neural network of the plurality of CSF neural networks corresponding to a first resource of the plurality of resources, and a second CSF neural network of the plurality of CSF neural networks corresponding to a second resource of the plurality of resources.

In a seventh aspect, alone or in combination with one or more of the first through sixth aspects, the at least one parameter indicates a first CSF neural network of the plurality of CSF neural networks corresponding to a first frequency range of the plurality of frequency ranges, and a second CSF neural network of the plurality of CSF neural networks corresponding to a second frequency range of the plurality of frequency ranges.

In an eighth aspect, alone or in combination with one or more of the first through seventh aspects, the first frequency range comprises a sub-6 gigahertz frequency range.

In a ninth aspect, alone or in combination with one or more of the first through eighth aspects, the second frequency range comprises a millimeter wave frequency range.

In a tenth aspect, alone or in combination with one or more of the first through ninth aspects, the at least one parameter indicates a first CSF neural network of the plurality of CSF neural networks corresponding to a first component carrier of the plurality of component carriers, and a second CSF neural network of the plurality of CSF neural networks corresponding to a second component carrier of the plurality of component carriers.

In an eleventh aspect, alone or in combination with one or more of the first through tenth aspects, the at least one parameter indicates a first CSF neural network of the plurality of CSF neural networks corresponding to a first RAN mode of the plurality of RAN modes, and a second CSF neural network of the plurality of CSF neural networks corresponding to a second RAN mode of the plurality of RAN modes.

Ina twelfth aspect, alone or in combination with one or more of the first through eleventh aspects, the capability of the first device is based at least in part on an amount of available memory of the first device.

In a thirteenth aspect, alone or in combination with one or more of the first through twelfth aspects, the amount of available memory corresponds to at least one bandwidth.

In a fourteenth aspect, alone or in combination with one or more of the first through thirteenth aspects, the neural network capability indication indicates at least one neural network complexity parameter corresponding to a neural network complexity that can be supported by the first device.

In a fifteenth aspect, alone or in combination with one or more of the first through fourteenth aspects, the at least one complexity parameter indicates at least one of a number of layers associated with the at least one CSF neural network, a number of layers corresponding to a bandwidth part associated with the at least one CSF neural network, a layer characteristic associated with the at least one CSF neural network, a non-linear activation function associated with the at least one CSF neural network, a time dependency capturing type associated with the at least one CSF neural network, a number of stackable layers of time dependencies associated with the at least one CSF neural network, a maximum layer size associated with the at least one CSF neural network, a maximum size of a hidden state in a time dependency layer associated with the at least one CSF neural network, a maximum size of a cell state in a time dependency layer associated with the at least one CSF neural network, a number of delay taps to be used for channel compression, a tap energy pruning criterion, or a combination thereof.

In a sixteenth aspect, alone or in combination with one or more of the first through fifteenth aspects, the layer characteristic indicates at least one of a fully-connected layer type, a convolutional layer type, a kernel size, a weight precision value, an activation function, or a combination thereof.

In a seventeenth aspect, alone or in combination with one or more of the first through sixteenth aspects, the neural network capability indication indicates a number of NSPs available on the first device.

In an eighteenth aspect, alone or in combination with one or more of the first through seventeenth aspects, the CSF neural network configuration further indicates a neural network based CSI-RS.

In a nineteenth aspect, alone or in combination with one or more of the first through eighteenth aspects, the CSF comprises a neural network based CSF and process 1000 includes receiving an indication to determine the CSF using an NSP, determining that the NSP is unavailable, and transmitting an unavailability indication based at least in part on determining that the NSP is unavailable.

In a twentieth aspect, alone or in combination with one or more of the first through nineteenth aspects, the indication to determine the CSF is carried in at least one of DCI, a MAC-CE, or a combination thereof.

In a twenty-first aspect, alone or in combination with one or more of the first through twentieth aspects, the unavailability indication is carried in at least one of UCI, an uplink MAC-CE, or a combination thereof.

In a twenty-second aspect, alone or in combination with one or more of the first through twenty-first aspects, determining that the NSP is unavailable comprises determining that the NSP is performing a task, and determining that a priority level associated with the task is higher than a priority level associated with determining the CSF.

In a twenty-third aspect, alone or in combination with one or more of the first through twenty-second aspects, process 1000 includes determining CSI based at least in part on determining that the NSP is unavailable, wherein the CSI comprises at least one of Type-I CSI, Type-II CSI, or a combination thereof.

In a twenty-fourth aspect, alone or in combination with one or more of the first through twenty-third aspects, process 1000 includes transmitting the CSI.

In a twenty-fifth aspect, alone or in combination with one or more of the first through twenty-fourth aspects, determining that the NSP is unavailable comprises determining that the NSP is unavailable at a first time, where the method further comprises determining that the NSP is available at a second time, determining the CSF at the second time using the NSP, and transmitting the CSF.

In a twenty-sixth aspect, alone or in combination with one or more of the first through twenty-fifth aspects, process 1000 includes receiving a capability request, wherein transmitting the neural network capability indication comprises transmitting the neural network capability indication based at least in part on receiving the capability request.

In a twenty-seventh aspect, alone or in combination with one or more of the first through twenty-sixth aspects, the capability request is carried in at least one of an RRC message, an RRC channel state information message, a MAC-CE, DCI, or a combination thereof.

In a twenty-eighth aspect, alone or in combination with one or more of the first through twenty-seventh aspects, the capability request is carried in a group message addressed to at least one additional first device.

In a twenty-ninth aspect, alone or in combination with one or more of the first through twenty-eighth aspects, the CSF neural network configuration is carried in a group message addressed to at least one additional first device, and wherein the at least one parameter indicates at least one of a number of delay taps to be used for channel compression, a tap energy pruning criterion, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
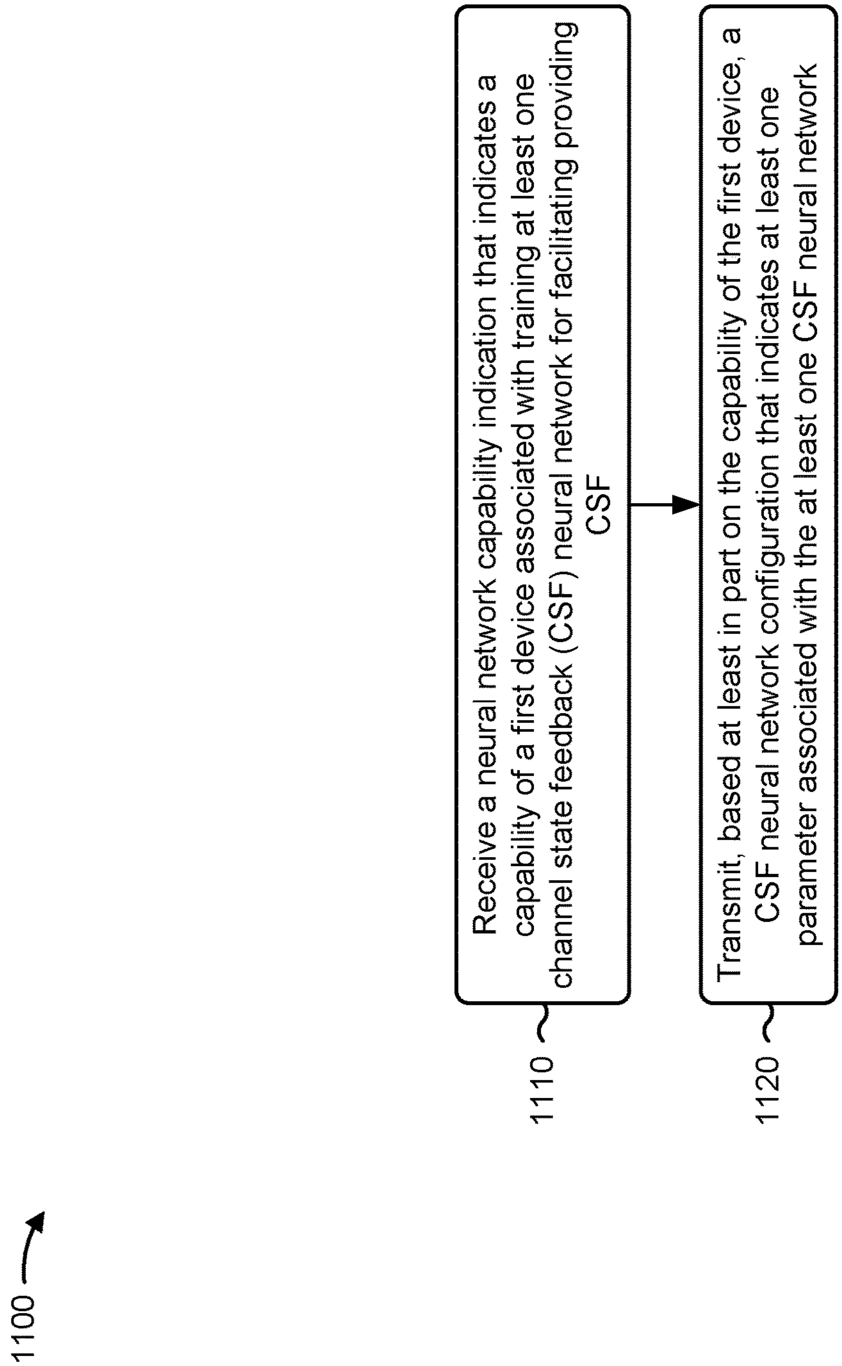

FIG. 11 is a diagram illustrating an example process 1100 performed, for example, by a second device, in accordance with the present disclosure. Example process 1100 is an example where the second device (e.g., second device 910 shown in FIG. 9, decoding device 350 shown in FIG. 3, the base station 110 shown in FIG. 1, and/or the like) performs operations associated with capability and configuration of a device for providing CSF feedback.

As shown in FIG. 11, in some aspects, process 1100 may include receiving a neural network capability indication that indicates a capability of a first device associated with training at least one CSF neural network for facilitating providing CSF (block 1110). For example, the second device (e.g., using reception component 1402) may receive a neural network capability indication that indicates a capability of a first device associated with training at least one CSF neural network for facilitating providing CSF, as described above.

As further shown in FIG. 11, in some aspects, process 1100 may include transmitting, based at least in part on the capability of the first device, a CSF neural network configuration that indicates at least one parameter associated with the at least one CSF neural network (block 1120). For example, the second device (e.g., using transmission component 1206) may transmit, based at least in part on the capability of the first device, a CSF neural network configuration that indicates at least one parameter associated with the at least one CSF neural network, as described above.

Process 1100 may include additional aspects, such as any single aspect or any combination of aspects described below and/or in connection with one or more other processes described elsewhere herein.

In a first aspect, process 1100 includes determining the CSF neural network configuration based at least in part on the capability of the first device.

In a second aspect, alone or in combination with the first aspect, the at least one parameter indicates a number of CSF neural networks to be configured.

In a third aspect, alone or in combination with one or more of the first and second aspects, the at least one CSF neural network comprises a plurality of CSF neural networks.

In a fourth aspect, alone or in combination with one or more of the first through third aspects, the at least one parameter indicates at least one of a plurality of bandwidths corresponding to a plurality of CSF neural networks, a plurality of BWPs corresponding to the plurality of CSF neural networks, a plurality of resources corresponding to the plurality of CSF neural networks, a plurality of frequency ranges corresponding to the plurality of CSF neural networks, a plurality of component carriers corresponding to the plurality of CSF neural networks, a plurality of RAN modes corresponding to the plurality of CSF neural networks, or a combination thereof.

In a fifth aspect, alone or in combination with one or more of the first through fourth aspects, the at least one parameter indicates a first CSF neural network of the plurality of CSF neural networks corresponding to a first bandwidth of the plurality of bandwidths, and a second CSF neural network of the plurality of CSF neural networks corresponding to a second bandwidth of the plurality of bandwidths.

In a sixth aspect, alone or in combination with one or more of the first through fifth aspects, the at least one parameter indicates a first CSF neural network of the plurality of CSF neural networks corresponding to a first bandwidth part of the plurality of BWPs, and a second CSF neural network of the plurality of CSF neural networks corresponding to a second bandwidth part of the plurality of BWPs.

In a seventh aspect, alone or in combination with one or more of the first through sixth aspects, the at least one parameter indicates a first CSF neural network of the plurality of CSF neural networks corresponding to a first resource of the plurality of resources, and a second CSF neural network of the plurality of CSF neural networks corresponding to a second resource of the plurality of resources.

In an eighth aspect, alone or in combination with one or more of the first through seventh aspects, the at least one parameter indicates a first CSF neural network of the plurality of CSF neural networks corresponding to a first frequency range of the plurality of frequency ranges, and a second CSF neural network of the plurality of CSF neural networks corresponding to a second frequency range of the plurality of frequency ranges.

In a ninth aspect, alone or in combination with one or more of the first through eighth aspects, the first frequency range comprises a sub-6 gigahertz frequency range.

In a tenth aspect, alone or in combination with one or more of the first through ninth aspects, the second frequency range comprises a millimeter wave frequency range.

In an eleventh aspect, alone or in combination with one or more of the first through tenth aspects, the at least one parameter indicates a first CSF neural network of the plurality of CSF neural networks corresponding to a first component carrier of the plurality of component carriers, and a second CSF neural network of the plurality of CSF neural networks corresponding to a second component carrier of the plurality of component carriers.

In a twelfth aspect, alone or in combination with one or more of the first through eleventh aspects, the at least one parameter indicates a first CSF neural network of the plurality of CSF neural networks corresponding to a first RAN mode of the plurality of RAN modes, and a second CSF neural network of the plurality of CSF neural networks corresponding to a second RAN mode of the plurality of RAN modes.

In a thirteenth aspect, alone or in combination with one or more of the first through twelfth aspects, the capability of the first device is based at least in part on an amount of available memory of the first device.

In a fourteenth aspect, alone or in combination with one or more of the first through thirteenth aspects, the amount of available memory corresponds to at least one bandwidth.

In a fifteenth aspect, alone or in combination with one or more of the first through fourteenth aspects, the neural network capability indication indicates at least one neural network complexity parameter corresponding to a neural network complexity that can be supported by the first device.

In a sixteenth aspect, alone or in combination with one or more of the first through fifteenth aspects, the at least one complexity parameter indicates at least one of a number of layers associated with the at least one CSF neural network, a number of layers corresponding to a bandwidth part associated with the at least one CSF neural network, a layer characteristic associated with the at least one CSF neural network, a non-linear activation function associated with the at least one CSF neural network, a time dependency capturing type associated with the at least one CSF neural network, a number of stackable layers of time dependencies associated with the at least one CSF neural network, a maximum layer size associated with the at least one CSF neural network, a maximum size of a hidden state in a time dependency layer associated with the at least one CSF neural network, a maximum size of a cell state in a time dependency layer associated with the at least one CSF neural network, a number of delay taps to be used for channel compression, a tap energy pruning criterion, or a combination thereof.

In a seventeenth aspect, alone or in combination with one or more of the first through sixteenth aspects, the layer characteristic indicates at least one of a fully-connected layer type, a convolutional layer type, a kernel size, a weight precision value, an activation function, or a combination thereof.

In an eighteenth aspect, alone or in combination with one or more of the first through seventeenth aspects, the neural network capability indication indicates a number of NSPs available on the first device.

In a nineteenth aspect, alone or in combination with one or more of the first through eighteenth aspects, the CSF neural network configuration further indicates a neural network based CSI-RS.

In a twentieth aspect, alone or in combination with one or more of the first through nineteenth aspects, the CSF comprises a neural network based CSF and process 1100 includes transmitting an indication to determine the CSF using a NSP, and receiving an unavailability indication that indicates that the NSP is unavailable.

In a twenty-first aspect, alone or in combination with one or more of the first through twentieth aspects, the indication to determine the CSF is carried in at least one of DCI, a MAC-CE, or a combination thereof.

In a twenty-second aspect, alone or in combination with one or more of the first through twenty-first aspects, the unavailability indication is carried in at least one of UCI, an uplink MAC-CE, or a combination thereof.

In a twenty-third aspect, alone or in combination with one or more of the first through twenty-second aspects, process 1100 includes receiving CSI that is based at least in part on a determination that the NSP is unavailable, wherein the CSI comprises at least one of Type-I CSI, Type-II CSI, or a combination thereof.

In a twenty-fourth aspect, alone or in combination with one or more of the first through twenty-third aspects, the unavailability indication indicates that transmission of the CSF is delayed until the NSP is available, wherein the NSP is unavailable at a first time, and receiving the CSF at a second time, wherein the NSP is available at the second time.

In a twenty-fifth aspect, alone or in combination with one or more of the first through twenty-fourth aspects, process 1100 includes transmitting a capability request, wherein the neural network capability indication is based at least in part on the capability request.

In a twenty-sixth aspect, alone or in combination with one or more of the first through twenty-fifth aspects, the capability request is carried in at least one of an RRC message, an RRC channel state information message, a MAC-CE, DCI, or a combination thereof.

In a twenty-seventh aspect, alone or in combination with one or more of the first through twenty-sixth aspects, the capability request is carried in a group message addressed to at least one additional first device.

In a twenty-eighth aspect, alone or in combination with one or more of the first through twenty-seventh aspects, the CSF neural network configuration is carried in a group message addressed to at least one additional first device, and wherein the at least one parameter indicates at least one of a number of delay taps to be used for channel compression, a tap energy pruning criterion, or a combination thereof.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
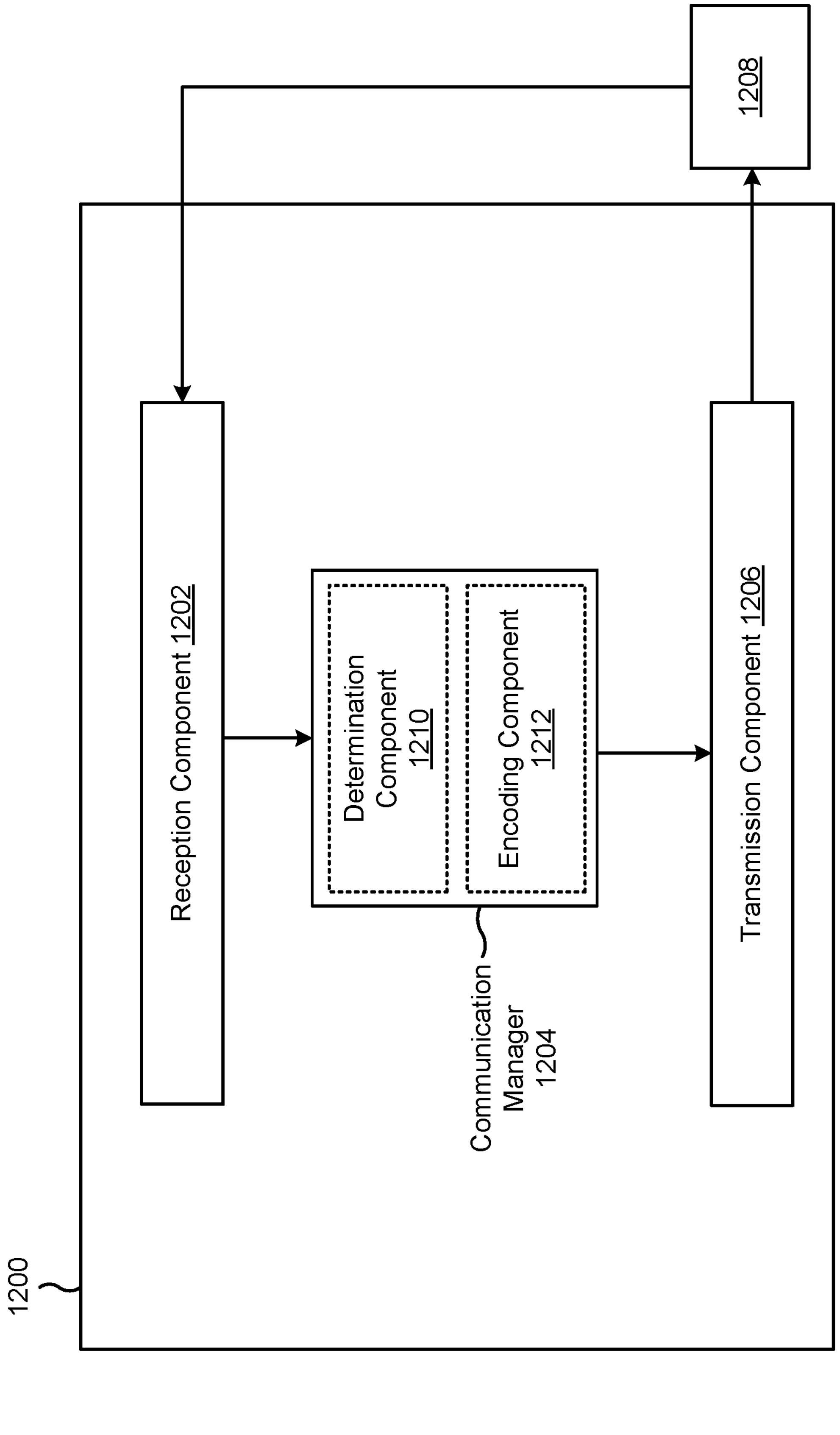
FIGS. 12 and 13 are examples of apparatuses for wireless communication, in accordance with the present disclosure.

FIG. 12 is a block diagram of an example apparatus 1200 for wireless communication in accordance with the present disclosure. The apparatus 1200 may be a first device (e.g., an encoding device), or a first device may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a decoding device, a base station, an encoding device, or another wireless communication device) using the reception component 1202 and the transmission component 1206.

In some aspects, the apparatus 1200 may be configured to perform one or more operations described herein in connection with FIGS. 3-9. Additionally, or alternatively, the apparatus 1200 may be configured to perform one or more processes described herein, such as process 1000 of FIG. 10. In some aspects, the apparatus 1200 may include one or more components of the UE 120 described above in connection with FIG. 2.

The reception component 1202 may provide means for receiving communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the first UE described above in connection with FIG. 2.

The transmission component 1206 may provide means for transmitting communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may provide means for performing signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the first UE described above in connection with FIG. 2. In some aspects, the transmission component 1206 may be co-located with the reception component 1202 in a transceiver.

In some aspects, the communication manager 1204 may provide means for transmitting a neural network capability indication that indicates a capability of the first device associated with training at least one CSF neural network for facilitating providing CSF; and means for receiving, based at least in part on the capability of the first device, a CSF neural network configuration that indicates at least one parameter associated with the at least one CSF neural network. In some aspects, the communication manager 1204 may provide means for generating a neural network capability indication and providing the neural network capability indication to the transmission component 1206 for transmission. In some aspects, the communication manager 1204 may include means for processing and/or implementing a CSF neural network configuration received by the reception component 1202. In some aspects, the communication manager 1204 may include a controller/processor, a memory, or a combination thereof, of the first UE described above in connection with FIG. 2.

In some aspects, the communication manager 1204 may include a set of components, such as a determination component 1210, an encoding component 1212, or a combination thereof. Alternatively, the set of components may be separate and distinct from the communication manager 1204. In some aspects, the determination component 1210 may include means for determining that an NSP is unavailable, means for determining CSI, and/or the like. In some aspects, the encoding component 1212 may include means for implementing one or more neural networks for encoding a data set such as, for example, CSF.

In some aspects, the communication manager 1204 and/or one or more components of the set of components may include or may be implemented within hardware (e.g., one or more of the circuitry described in connection with FIG. 16). In some aspects, the communication manager 1204 and/or one or more components of the set of components may include or may be implemented within a controller/processor, a memory, or a combination thereof, of the UE 120 described above in connection with FIG. 2.

In some aspects, the communication manager 1204 and/or one or more components of the set of components may be implemented in code (e.g., as software or firmware stored in a memory), such as the code described in connection with FIG. 16. For example, the communication manager 1204 and/or a component (or a portion of a component) may be implemented as instructions or code stored in a non-transitory computer-readable medium and executable by a controller or a processor to perform the functions or operations of the communication manager 1204 and/or the component. If implemented in code, the functions of the communication manager 1204 and/or a component may be executed by a controller/processor, a memory, a scheduler, a communication unit, or a combination thereof, of the UE 120 described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
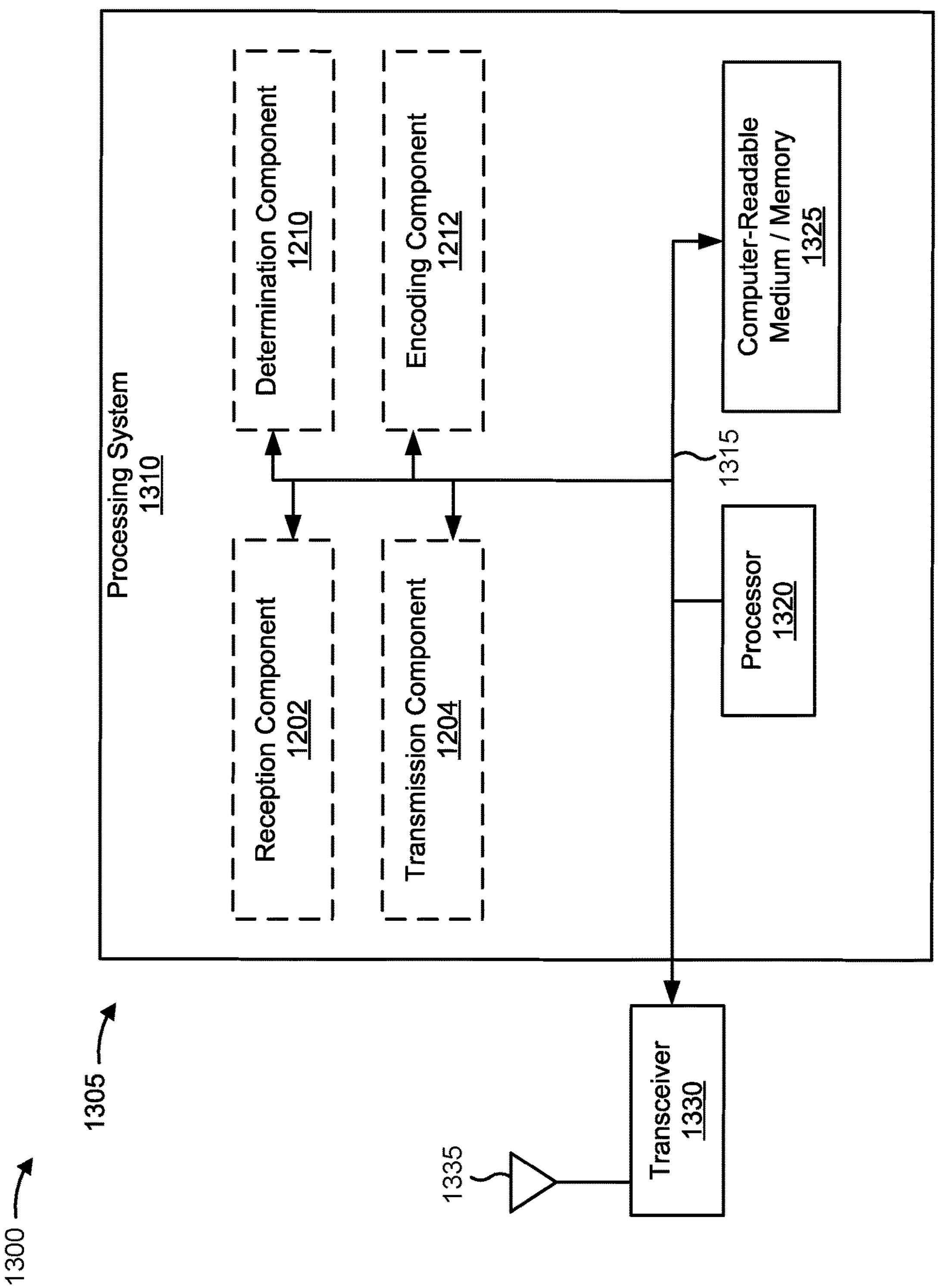

FIG. 13 is a diagram illustrating an example 1300 of a hardware implementation for an apparatus 1305 employing a processing system 1310. The apparatus 1305 may be a first device (e.g., the apparatus 1200 shown in FIG. 12, the first device 905 shown in FIG. 9, and/or the like).

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, power management circuits, and/or the like.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1206, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. For example, the processing system may include the determination component 1210, the encoding component 1212, and/or the like. The components may be software modules running in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the RX processor 258, and/or the controller/processor 280. In some aspects, the apparatus 1305 for wireless communication provides means for transmitting a neural network capability indication that indicates a capability of the first device associated with training at least one CSF neural network for facilitating. In some aspects, the apparatus 1305 for wireless communication may provide means for receiving, based at least in part on the capability of the first device, a CSF neural network configuration that indicates at least one parameter associated with the at least one CSF neural network. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

Figure 14:
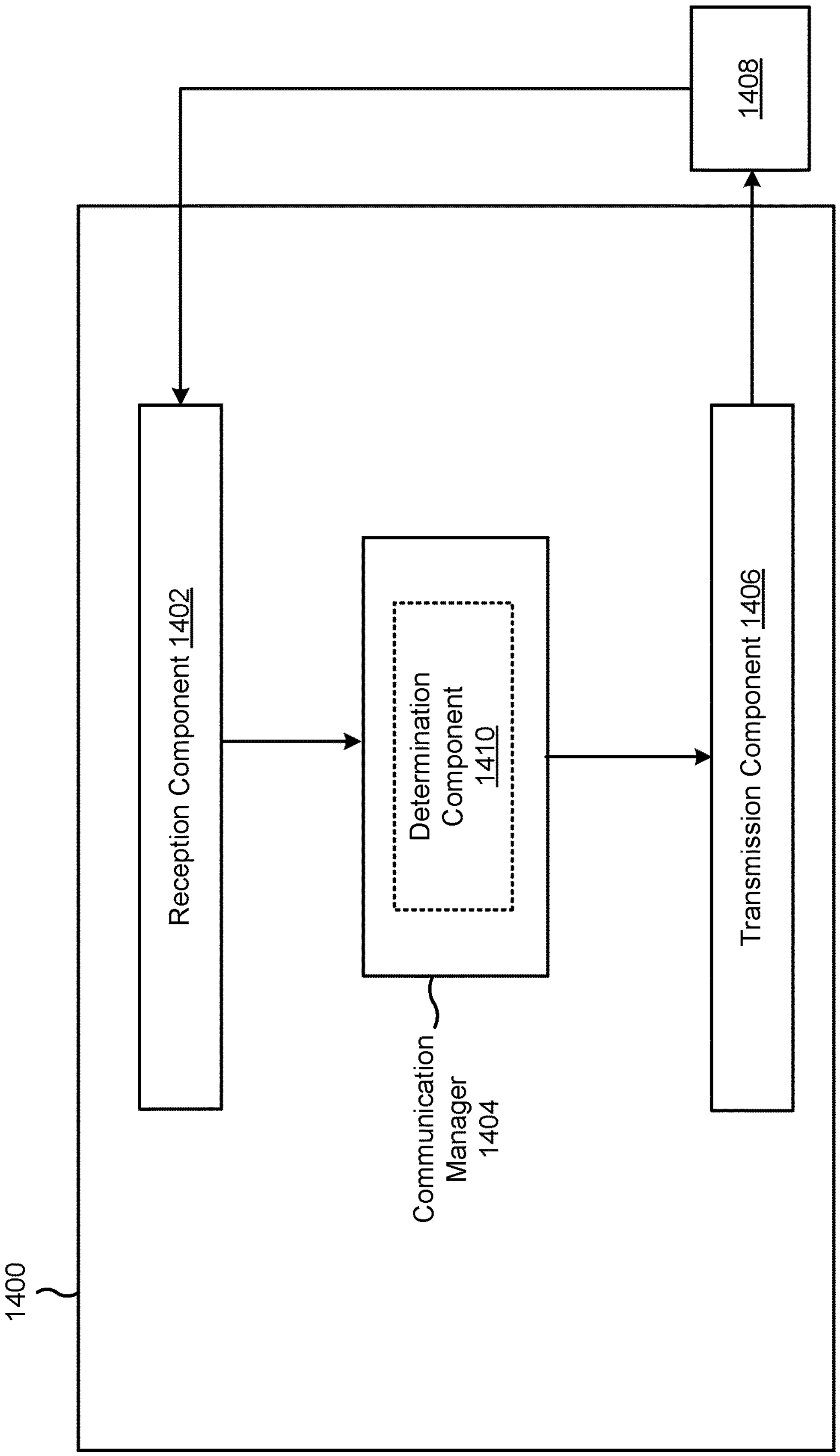
FIGS. 14 and 15 are diagrams illustrating examples of a hardware implementation for an apparatus employing a processing system, in accordance with the present disclosure.

FIG. 14 is a block diagram of an example apparatus 1400 for wireless communication in accordance with the present disclosure. The apparatus 1400 may be a second device (e.g., the second device 910 shown in FIG. 9, the decoding device 350 shown in FIG. 3, the base station 110 shown in FIG. 1, and/or the like), or a second device may include the apparatus 1400. In some aspects, the apparatus 1400 includes a reception component 1402, a communication manager 1404, and a transmission component 1406, which may be in communication with one another (for example, via one or more buses). As shown, the apparatus 1400 may communicate with another apparatus 1408 (such as a first device, a UE, a base station, or another wireless communication device) using the reception component 1402 and the transmission component 1406.

In some aspects, the apparatus 1400 may be configured to perform one or more operations described herein in connection with FIGS. 4-9. Additionally or alternatively, the apparatus 1400 may be configured to perform one or more processes described herein, such as process 1100 of FIG. 11. In some aspects, the apparatus 1400 may include one or more components of the base station described above in connection with FIG. 2.

The reception component 1402 may provide means for receiving communications, such as reference signals, control information, data communications, or a combination thereof, from the apparatus 1408. The reception component 1402 may provide received communications to one or more other components of the apparatus 1400, such as the communication manager 1404. In some aspects, the reception component 1402 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a demodulator, a MIMO detector, a receive processor, a controller/processor, a memory, or a combination thereof, of the base station described above in connection with FIG. 2.

The transmission component 1406 may provide means for transmitting communications, such as reference signals, control information, data communications, or a combination thereof, to the apparatus 1408. In some aspects, the communication manager 1404 may generate communications and may transmit the generated communications to the transmission component 1406 for transmission to the apparatus 1408. In some aspects, the transmission component 1406 may provide means for performing signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1406 may include one or more antennas, a modulator, a transmit MIMO processor, a transmit processor, a controller/processor, a memory, or a combination thereof, of the base station described above in connection with FIG. 2. In some aspects, the transmission component 1406 may be co-located with the reception component 1402 in a transceiver.

The communication manager 1404 may provide means for receiving a neural network capability indication that indicates a capability of a first device associated with training at least one CSF neural network for facilitating providing CSF. The communication manager 1404 may provide means for transmitting, based at least in part on the capability of the first device, a CSF neural network configuration that indicates at least one parameter associated with the at least one CSF neural network. In some aspects, the communication manager 1404 may include a controller/processor, a memory, a scheduler, a communication unit, or a combination thereof, of the base station described above in connection with FIG. 2.

In some aspects, the communication manager 1404 may include a set of components, such as a determination component 1410. Alternatively, the set of components may be separate and distinct from the communication manager 1404. In some aspects, the determination component 1410 may provide means for determining a CSF neural network configuration based at least in part on a neural network capability indication received from a first device.

In some aspects, the communication manager 1404 and/or one or more components of the set of components may include or may be implemented within hardware (e.g., one or more of the circuitry described in connection with FIG. 17). In some aspects, the communication manager 1404 and/or one or more components of the set of components may include or may be implemented within a controller/processor, a memory, or a combination thereof, of the BS 110 described above in connection with FIG. 2.

In some aspects, the communication manager 1404 and/or one or more components of the set of components may be implemented in code (e.g., as software or firmware stored in a memory), such as the code described in connection with FIG. 17. For example, the communication manager 1404 and/or a component (or a portion of a component) may be implemented as instructions or code stored in a non-transitory computer-readable medium and executable by a controller or a processor to perform the functions or operations of the communication manager 1404 and/or the component. If implemented in code, the functions of the communication manager 1404 and/or a component may be executed by a controller/processor, a memory, a scheduler, a communication unit, or a combination thereof, of the BS 110 described above in connection with FIG. 2.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
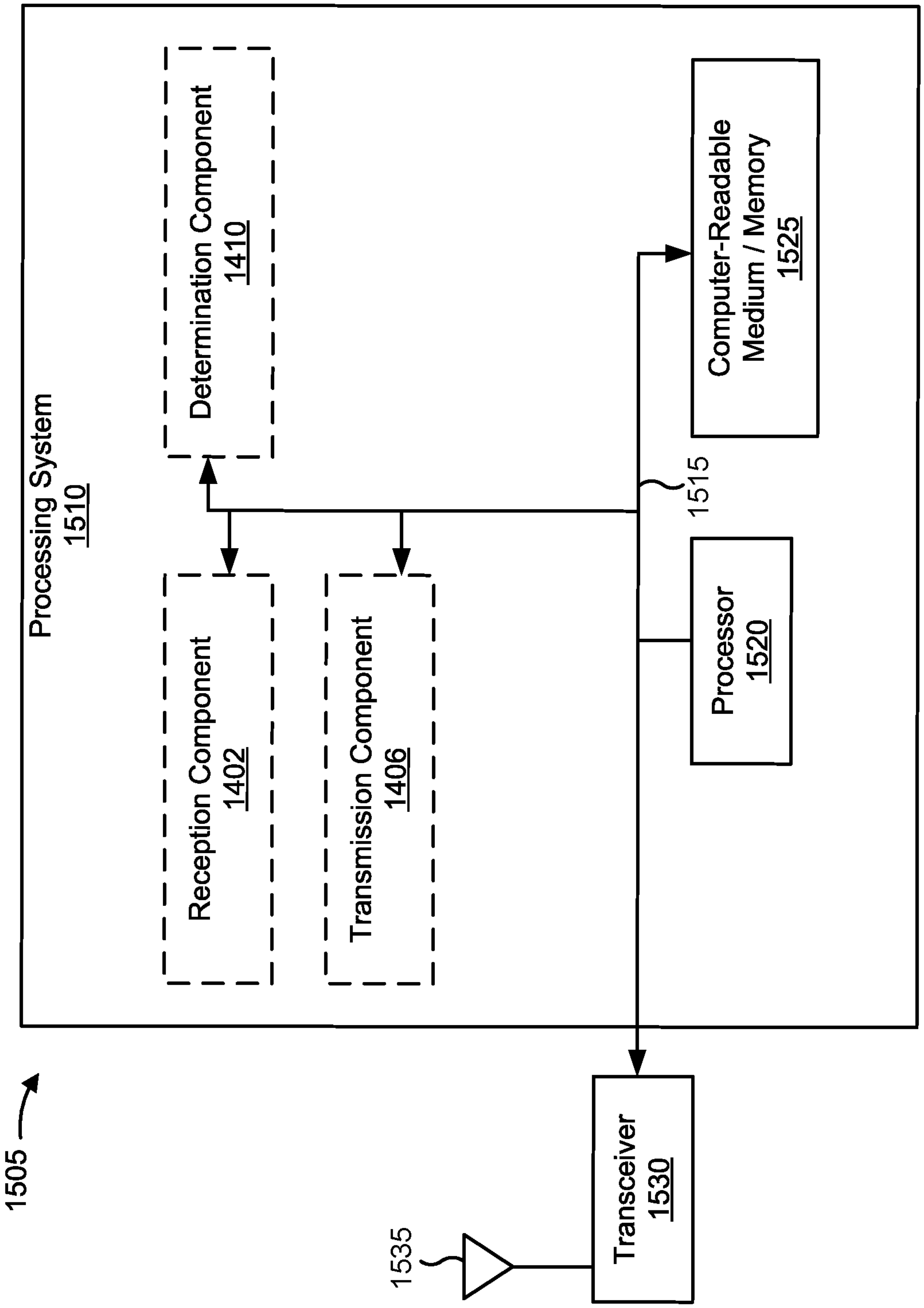

FIG. 15 is a diagram illustrating an example 1500 of a hardware implementation for an apparatus 1505 employing a processing system 1510. The apparatus 1505 may be a base station.

The processing system 1510 may be implemented with a bus architecture, represented generally by the bus 1515. The bus 1515 may include any number of interconnecting buses and bridges depending on the specific application of the processing system 1510 and the overall design constraints. The bus 1515 links together various circuits including one or more processors and/or hardware components, represented by the processor 1520, the illustrated components, and the computer-readable medium/memory 1525. The bus 1515 may also link various other circuits, such as timing sources, peripherals, voltage regulators, power management circuits, and/or the like.

The processing system 1510 may be coupled to a transceiver 1530. The transceiver 1530 is coupled to one or more antennas 1535. The transceiver 1530 provides a means for communicating with various other apparatuses over a transmission medium. The transceiver 1530 receives a signal from the one or more antennas 1535, extracts information from the received signal, and provides the extracted information to the processing system 1510, specifically the reception component 1402. In addition, the transceiver 1530 receives information from the processing system 1510, specifically the transmission component 1406, and generates a signal to be applied to the one or more antennas 1535 based at least in part on the received information.

The processing system 1510 includes a processor 1520 coupled to a computer-readable medium/memory 1525. The processor 1520 is responsible for general processing, including the execution of software stored on the computer-readable medium/memory 1525. The software, when executed by the processor 1520, causes the processing system 1510 to perform the various functions described herein for any particular apparatus. The computer-readable medium/memory 1525 may also be used for storing data that is manipulated by the processor 1520 when executing software. The processing system further includes at least one of the illustrated components. For example, the processing system may include the determination component 1410. The components may be software modules running in the processor 1520, resident/stored in the computer readable medium/memory 1525, one or more hardware modules coupled to the processor 1520, or some combination thereof.

In some aspects, the processing system 1510 may be a component of the base station 110 and may include the memory 242 and/or at least one of the TX MIMO processor 230, the RX processor 238, and/or the controller/processor 240. In some aspects, the apparatus 1505 for wireless communication includes means for receiving a neural network capability indication that indicates a capability of a first device associated with training at least one CSF neural network for facilitating providing CSF. The apparatus 1505 for wireless communication may include means for transmitting, based at least in part on the capability of the first device, a CSF neural network configuration that indicates at least one parameter associated with the at least one CSF neural network. The aforementioned means may be one or more of the aforementioned components of the apparatus 1400 and/or the processing system 1510 of the apparatus 1505 configured to perform the functions recited by the aforementioned means. As described elsewhere herein, the processing system 1510 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 15 is provided as an example. Other examples may differ from what is described in connection with FIG. 15.

Figure 16:
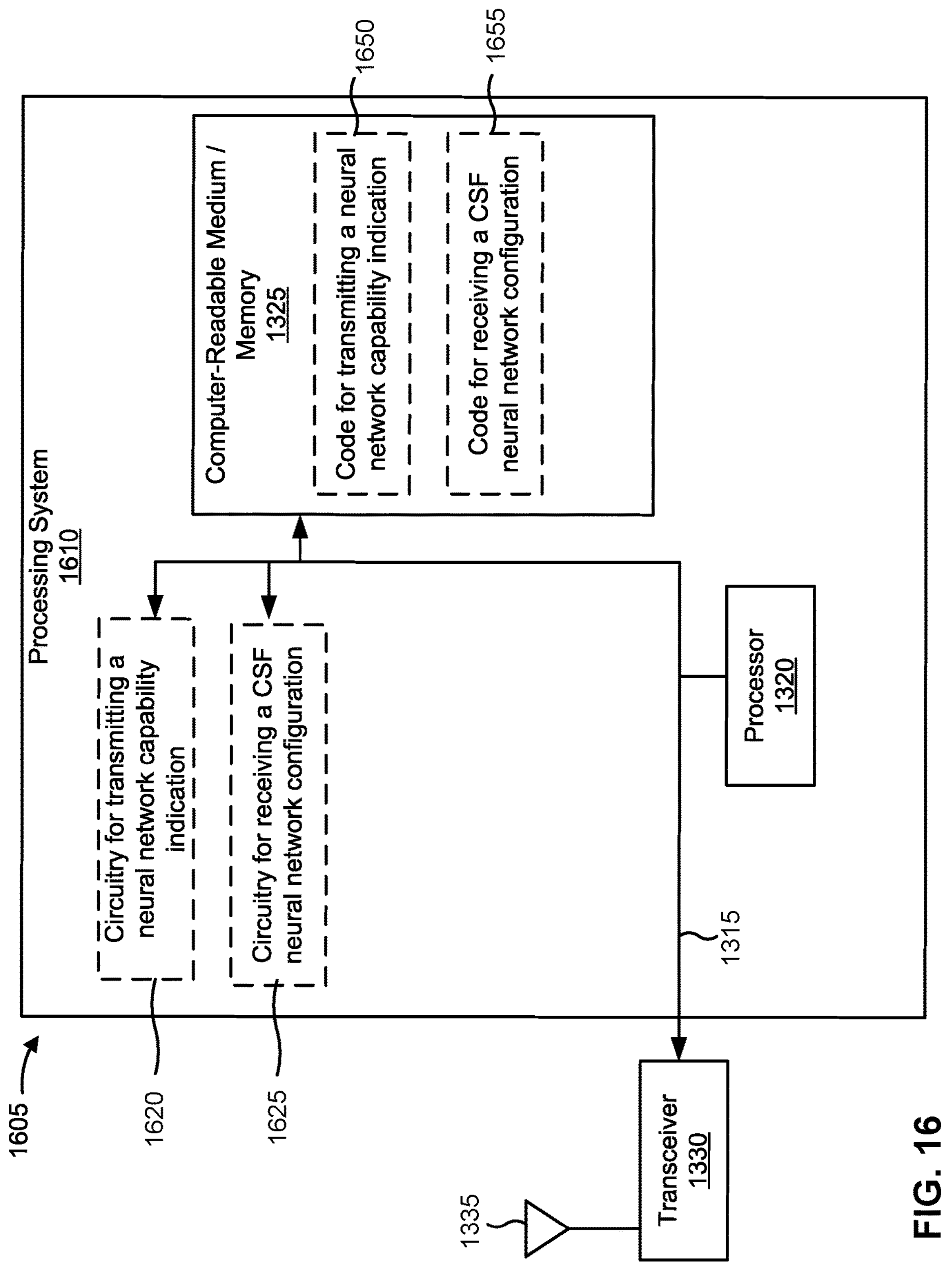
FIGS. 16 and 17 are diagrams illustrating examples of implementations of code and circuitry for an apparatus, in accordance with the present disclosure.

FIG. 16 is a diagram illustrating an example of an implementation of code and circuitry for an apparatus 1605. The apparatus 1605 may be a first device (e.g., an encoding device, a UE, and/or the like).

As further shown in FIG. 16, the apparatus 1605 may include circuitry for transmitting a neural network capability indication (circuitry 1620). For example, the apparatus 1605 may include circuitry to enable the apparatus 1605 to transmit a neural network capability indication that indicates a capability of the apparatus 1605 associated with training at least one CSF neural network for facilitating providing CSF.

As further shown in FIG. 16, the apparatus 1605 may include circuitry for receiving a CSF neural network configuration (circuitry 1625). For example, the apparatus 1605 may include circuitry to receive, based at least in part on the capability of the apparatus 1605, a CSF neural network configuration that indicates at least one parameter associated with the at least one CSF neural network.

As further shown in FIG. 16, the apparatus 1605 may include, stored in computer-readable medium 1325, code for transmitting a neural network capability indication (code 1650). For example, the apparatus 1605 may include code that, when executed by the processor 1320, may cause the processor 1320 to transmit a neural network capability indication that indicates a capability of the apparatus 1605 associated with training at least one CSF neural network for facilitating providing CSF.

As further shown in FIG. 16, the apparatus 1605 may include, stored in computer-readable medium 1325, code for receiving a CSF neural network configuration (code 1655). For example, the apparatus 1605 may include code that, when executed by the processor 1320, may cause the transceiver 1330 to receive, based at least in part on the capability of the apparatus 1605, a CSF neural network configuration that indicates at least one parameter associated with the at least one CSF neural network.

FIG. 16 is provided as an example. Other examples may differ from what is described in connection with FIG. 16.

Figure 17:
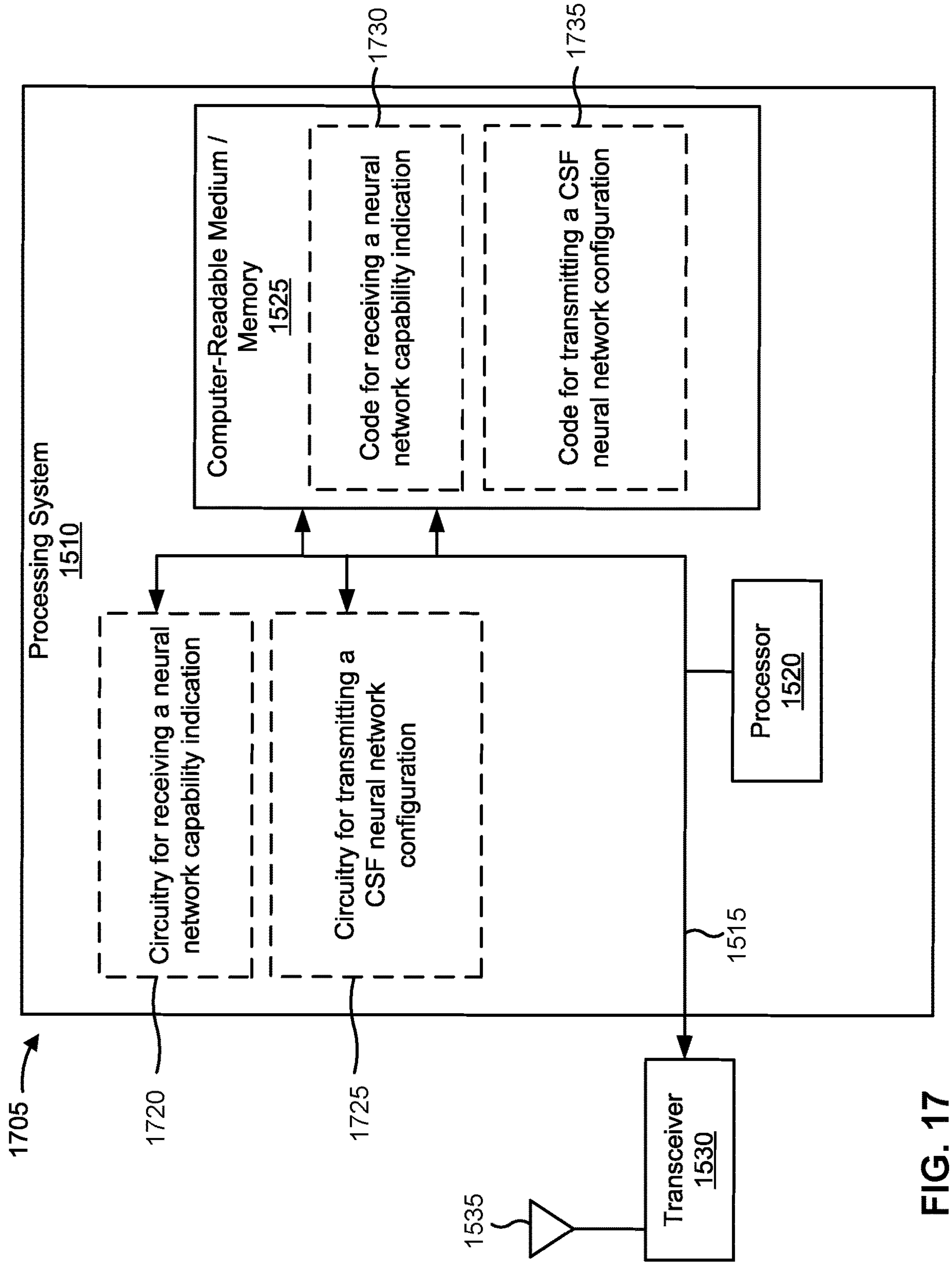

FIG. 17 is a diagram illustrating an example of an implementation of code and circuitry for an apparatus 1705. The apparatus 1705 may be a second device (e.g., a decoding device, a base station, and/or the like).

As further shown in FIG. 17, the apparatus 1705 may include circuitry for receiving a neural network capability indication (circuitry 1720). For example, the apparatus 1705 may include circuitry to enable the apparatus 1705 to receive a neural network capability indication that indicates a capability of a first device associated with training at least one CSF neural network for facilitating providing CSF.

As further shown in FIG. 17, the apparatus 1705 may include circuitry for transmitting a CSF neural network configuration (circuitry 1725). For example, the apparatus 1705 may include circuitry to enable the apparatus 1705 to transmit, based at least in part on the capability of the first device, a CSF neural network configuration that indicates at least one parameter associated with the at least one CSF neural network.

As further shown in FIG. 17, the apparatus 1705 may include, stored in computer-readable medium 1525, code for receiving a neural network capability indication (code 1730). For example, the apparatus 1705 may include code that, when executed by the processor 1520, may cause the processor 1520 to receive a neural network capability indication that indicates a capability of a first device associated with training at least one CSF neural network for facilitating providing CSF.

As further shown in FIG. 17, the apparatus 1705 may include, stored in computer-readable medium 1525, code for transmitting a CSF neural network configuration (code 1735). For example, the apparatus 1705 may include code that, when executed by the processor 1520, may cause the transceiver 1530 to transmit, based at least in part on the capability of the first device, a CSF neural network configuration that indicates at least one parameter associated with the at least one CSF neural network.

FIG. 17 is provided as an example. Other examples may differ from what is described in connection with FIG. 17.

Figure 18:
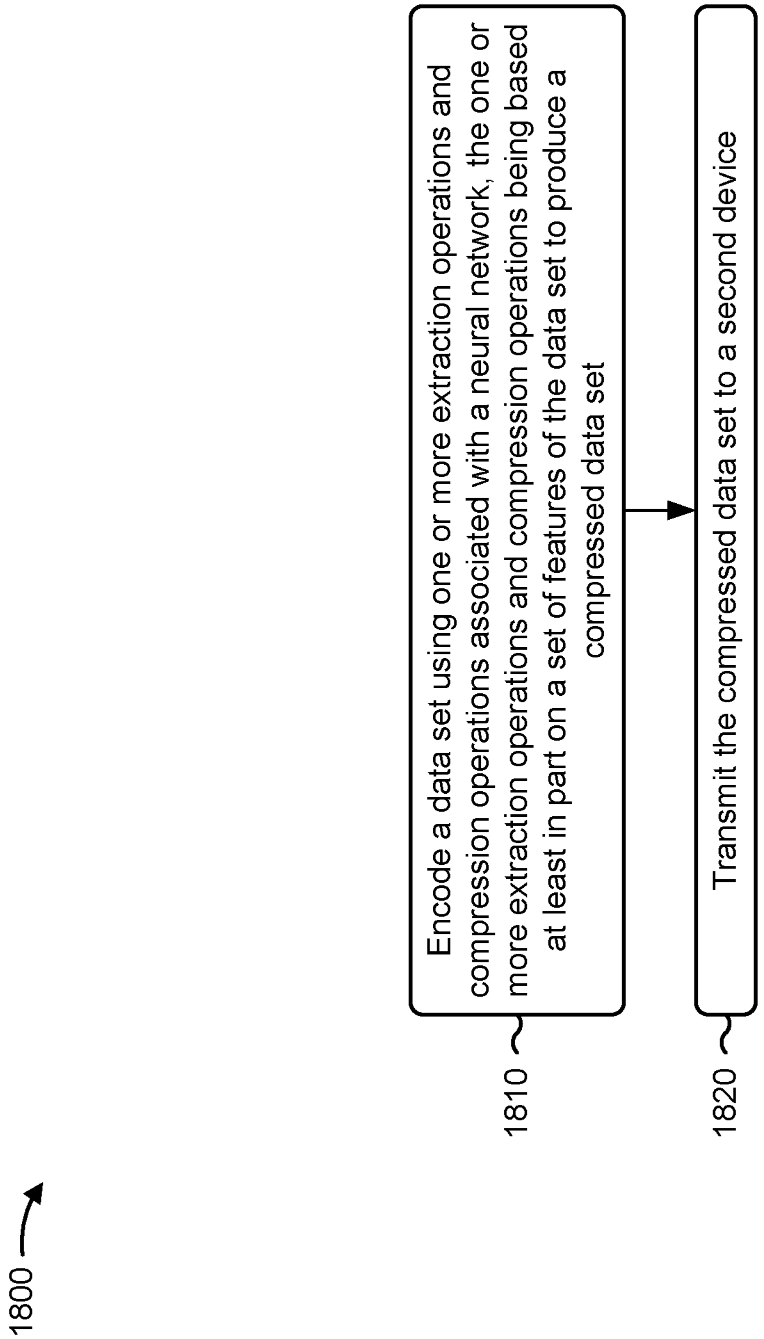
FIGS. 18 and 19 are diagrams illustrating example processes associated with encoding a data set using a neural network for uplink communication, in accordance with the present disclosure.

FIG. 18 is a diagram illustrating an example process 1800 performed, for example, by a first device, in accordance with the present disclosure. Example process 1800 is an example where the first device (e.g., an encoding device, UE 120, apparatus 1200 of FIG. 12, and/or the like) performs operations associated with encoding a data set using a neural network.

As shown in FIG. 18, in some aspects, process 1800 may include encoding a data set using one or more extraction operations and compression operations associated with a neural network, the one or more extraction operations and compression operations being based at least in part on a set of features of the data set to produce a compressed data set (block 1810). For example, the first device (e.g., using encoding component 1212 shown in FIG. 12) may encode a data set using one or more extraction operations and compression operations associated with a neural network, the one or more extraction operations and compression operations being based at least in part on a set of features of the data set to produce a compressed data set, as described above.

As further shown in FIG. 18, in some aspects, process 1800 may include transmitting the compressed data set to a second device (block 1820). For example, the first device (e.g., using transmission component 1206 shown in FIG. 12) may transmit the compressed data set to a second device, as described above.

Process 1800 may include additional aspects, such as any single aspect or any combination of aspects described below and/or in connection with one or more other processes described elsewhere herein.

In a first aspect, the data set is based at least in part on sampling of one or more reference signals In a second aspect, alone or in combination with the first aspect, transmitting the compressed data set to the second device includes transmitting channel state information feedback to the second device.

In a third aspect, alone or in combination with one or more of the first and second aspects, process 1800 includes identifying the set of features of the data set, wherein the one or more extraction operations and compression operations includes a first type of operation performed in a dimension associated with a feature of the set of features of the data set, and a second type of operation, that is different from the first type of operation, performed in remaining dimensions associated with other features of the set of features of the data set.

In a fourth aspect, alone or in combination with one or more of the first through third aspects, the first type of operation includes a one-dimensional fully connected layer operation, and the second type of operation includes a convolution operation.

In a fifth aspect, alone or in combination with one or more of the first through fourth aspects, the one or more extraction operations and compression operations include multiple operations that include one or more of a convolution operation, a fully connected layer operation, or a residual neural network operation.

In a sixth aspect, alone or in combination with one or more of the first through fifth aspects, the one or more extraction operations and compression operations include a first extraction operation and a first compression operation performed for a first feature of the set of features of the data set, and a second extraction operation and a second compression operation performed for a second feature of the set of features of the data set.

In a seventh aspect, alone or in combination with one or more of the first through sixth aspects, process 1800 includes performing one or more additional operations on an intermediate data set that is output after performing the one or more extraction operations and compression operations.

In an eighth aspect, alone or in combination with one or more of the first through seventh aspects, the one or more additional operations include one or more of a quantization operation, a flattening operation, or a fully connected operation.

In a ninth aspect, alone or in combination with one or more of the first through eighth aspects, the set of features of the data set includes one or more of a spatial feature, or a tap domain feature.

In a tenth aspect, alone or in combination with one or more of the first through ninth aspects, the one or more extraction operations and compression operations include one or more of a spatial feature extraction using a one-dimensional convolution operation, a temporal feature extraction using a one-dimensional convolution operation, a residual neural network operation for refining an extracted spatial feature, a residual neural network operation for refining an extracted temporal feature, a pointwise convolution operation for compressing the extracted spatial feature, a pointwise convolution operation for compressing the extracted temporal feature, a flattening operation for flattening the extracted spatial feature, a flattening operation for flattening the extracted temporal feature, or a compression operation for compressing one or more of the extracted temporal feature or the extracted spatial feature into a low dimension vector for transmission.

In an eleventh aspect, alone or in combination with one or more of the first through tenth aspects, the one or more extraction operations and compression operations include a first feature extraction operation associated with one or more features that are associated with a second device, a first compression operation for compressing the one or more features that are associated with the second device, a second feature extraction operation associated with one or more features that are associated with the first device, and a second compression operation for compressing the one or more features that are associated with the first device.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
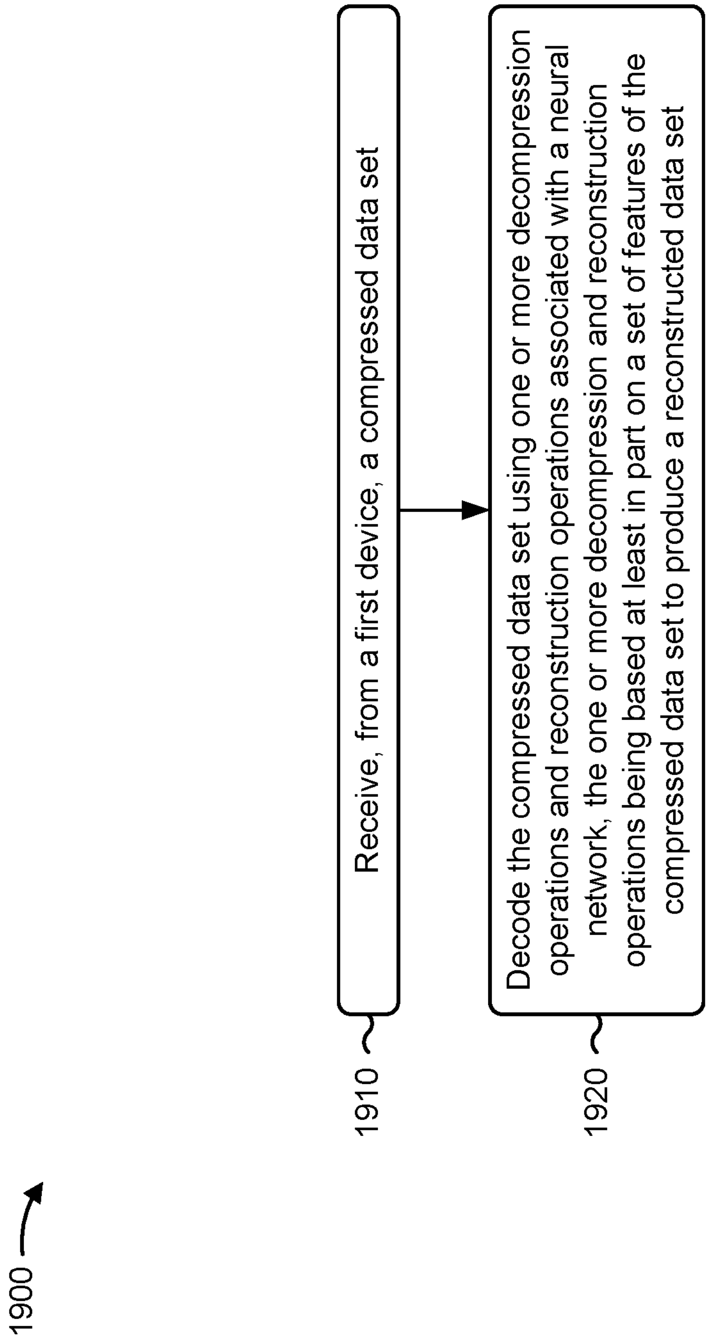

FIG. 19 is a diagram illustrating an example process 1900 performed, for example, by a second device, in accordance with the present disclosure. Example process 1900 is an example where the second device (e.g., a decoding device, base station 110, apparatus 1200 of FIG. 12, and/or the like) performs operations associated with decoding a data set using a neural network.

As shown in FIG. 19, in some aspects, process 1900 may include receiving, from a first device, a compressed data set (block 1910). For example, the second device (e.g., using reception component 1402 shown in FIG. 14) may receive, from a first device, a compressed data set, as described above.

As further shown in FIG. 19, in some aspects, process 1900 may include decoding the compressed data set using one or more decompression operations and reconstruction operations associated with a neural network, the one or more decompression and reconstruction operations being based at least in part on a set of features of the compressed data set to produce a reconstructed data set (block 1920). For example, the second device (e.g., using communication manager 1404 shown in FIG. 14) may decode the compressed data set using one or more decompression operations and reconstruction operations associated with a neural network, the one or more decompression and reconstruction operations being based at least in part on a set of features of the compressed data set to produce a reconstructed data set, as described above.

Process 1900 may include additional aspects, such as any single aspect or any combination of aspects described below and/or in connection with one or more other processes described elsewhere herein.

In a first aspect, decoding the compressed data set using the one or more decompression operations and reconstruction operations includes performing the one or more decompression operations and reconstruction operations based at least in part on an assumption that the first device generated the compressed data set using a set of operations that are symmetric to the one or more decompression operations and reconstruction operations, or performing the one or more decompression operations and reconstruction operations based at least in part on an assumption that the first device generated the compressed data set using a set of operations that are asymmetric to the one or more decompression operations and reconstruction operations.

In a second aspect, alone or in combination with the first aspect, the compressed data set is based at least in part on sampling by the first device of one or more reference signals.

In a third aspect, alone or in combination with one or more of the first and second aspects, receiving the compressed data set includes receiving channel state information feedback from the first device.

In a fourth aspect, alone or in combination with one or more of the first through third aspects, the one or more decompression operations and reconstruction operations include a first type of operation performed in a dimension associated with a feature of the set of features of the compressed data set, and a second type of operation, that is different from the first type of operation, performed in remaining dimensions associated with other features of the set of features of the compressed data set.

In a fifth aspect, alone or in combination with one or more of the first through fourth aspects, the first type of operation includes a one-dimensional fully connected layer operation, and wherein the second type of operation includes a convolution operation.

In a sixth aspect, alone or in combination with one or more of the first through fifth aspects, the one or more decompression operations and reconstruction operations include multiple operations that include one or more of a convolution operation, a fully connected layer operation, or a residual neural network operation.

In a seventh aspect, alone or in combination with one or more of the first through sixth aspects, the one or more decompression operations and reconstruction operations include a first operation performed for a first feature of the set of features of the compressed data set, and a second operation performed for a second feature of the set of features of the compressed data set.

In an eighth aspect, alone or in combination with one or more of the first through seventh aspects, process 1900 includes performing a reshaping operation on the compressed data set.

In a ninth aspect, alone or in combination with one or more of the first through eighth aspects, the set of features of the compressed data set include one or more of a spatial feature or a tap domain feature.

In a tenth aspect, alone or in combination with one or more of the first through ninth aspects, the one or more decompression operations and reconstruction operations include one or more of a feature decompression operation, a temporal feature reconstruction operation, or a spatial feature reconstruction operation.

In an eleventh aspect, alone or in combination with one or more of the first through tenth aspects, the one or more decompression operations and reconstruction operations include a first feature reconstruction operation performed for one or more features associated with the first device, and a second feature reconstruction operation performed for one or more features associated with the second device.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

The following provides an overview of some Aspects of the present disclosure:

Aspect 1: A method of wireless communication performed by a first device, comprising: transmitting a neural network capability indication that indicates a capability of the first device associated with training at least one channel state feedback (CSF) neural network for facilitating providing CSF; and receiving, based at least in part on the capability of the first device, a CSF neural network configuration that indicates at least one parameter associated with the at least one CSF neural network.

Aspect 2: The method of Aspect 1, wherein the at least one parameter indicates a number of CSF neural networks to be configured.

Aspect 3: The method of either of Aspects 1 or 2, wherein the at least one CSF neural network comprises a plurality of CSF neural networks.

Aspect 4: The method of any of Aspects 1-3, wherein the at least one parameter indicates at least one of: a plurality of bandwidths corresponding to a plurality of CSF neural networks, a plurality of bandwidth parts corresponding to the plurality of CSF neural networks, a plurality of resources corresponding to the plurality of CSF neural networks, a plurality of frequency ranges corresponding to the plurality of CSF neural networks, a plurality of component carriers corresponding to the plurality of CSF neural networks, a plurality of radio access network (RAN) modes corresponding to the plurality of CSF neural networks, or a combination thereof.

Aspect 5: The method of Aspect 4, wherein the at least one parameter indicates: a first CSF neural network of the plurality of CSF neural networks corresponding to a first bandwidth of the plurality of bandwidths; and a second CSF neural network of the plurality of CSF neural networks corresponding to a second bandwidth of the plurality of bandwidths.

Aspect 6: The method of either of Aspects 4 or 5, wherein the at least one parameter indicates: a first CSF neural network of the plurality of CSF neural networks corresponding to a first bandwidth part of the plurality of bandwidth parts; and a second CSF neural network of the plurality of CSF neural networks corresponding to a second bandwidth part of the plurality of bandwidth parts.

Aspect 7: The method of any of Aspects 4-6, wherein the at least one parameter indicates: a first CSF neural network of the plurality of CSF neural networks corresponding to a first resource of the plurality of resources; and a second CSF neural network of the plurality of CSF neural networks corresponding to a second resource of the plurality of resources.

Aspect 8: The method of any of Aspects 4-7, wherein the at least one parameter indicates: a first CSF neural network of the plurality of CSF neural networks corresponding to a first frequency range of the plurality of frequency ranges; and a second CSF neural network of the plurality of CSF neural networks corresponding to a second frequency range of the plurality of frequency ranges.

Aspect 9: The method of Aspect 8, wherein the first frequency range comprises a sub-6 gigahertz frequency range.

Aspect 10: The method of Aspect 9, wherein the second frequency range comprises a millimeter wave frequency range.

Aspect 11: The method of any of Aspects 4-10, wherein the at least one parameter indicates: a first CSF neural network of the plurality of CSF neural networks corresponding to a first component carrier of the plurality of component carriers; and a second CSF neural network of the plurality of CSF neural networks corresponding to a second component carrier of the plurality of component carriers.

Aspect 12: The method of any of Aspects 4-11, wherein the at least one parameter indicates: a first CSF neural network of the plurality of CSF neural networks corresponding to a first RAN mode of the plurality of RAN modes; and a second CSF neural network of the plurality of CSF neural networks corresponding to a second RAN mode of the plurality of RAN modes.

Aspect 13: The method of any of Aspects 1-12, wherein the capability of the first device is based at least in part on an amount of available memory of the first device.

Aspect 14: The method of Aspect 13, wherein the amount of available memory corresponds to at least one bandwidth.

Aspect 15: The method of any of Aspects 1-14, wherein the neural network capability indication indicates at least one neural network complexity parameter corresponding to a neural network complexity that can be supported by the first device.

Aspect 16: The method of Aspect 15, wherein the at least one complexity parameter indicates at least one of: a number of layers associated with the at least one CSF neural network, a number of layers corresponding to a bandwidth part associated with the at least one CSF neural network, a layer characteristic associated with the at least one CSF neural network, a non-linear activation function associated with the at least one CSF neural network, a time dependency capturing type associated with the at least one CSF neural network, a number of stackable layers of time dependencies associated with the at least one CSF neural network, a maximum layer size associated with the at least one CSF neural network, a maximum size of a hidden state in a time dependency layer associated with the at least one CSF neural network, a maximum size of a cell state in a time dependency layer associated with the at least one CSF neural network, a number of delay taps to be used for channel compression, a tap energy pruning criterion, or a combination thereof.

Aspect 17: The method of Aspect 16, wherein the layer characteristic indicates at least one of: a fully-connected layer type, a convolutional layer type, a kernel size, a weight precision value, an activation function, or a combination thereof.

Aspect 18: The method of any of Aspects 1-17, wherein the neural network capability indication indicates a number of neural signal processors available on the first device.

Aspect 19: The method of any of Aspects 1-18, wherein the CSF neural network configuration further indicates a neural network based channel state information (CSI) reference signal (CSI-RS).

Aspect 20: The method of any of Aspects 1-19, wherein the CSF comprises a neural network based CSF and the method further comprises: receiving an indication to determine the CSF using a neural signal processor; determining that the neural signal processor is unavailable; and transmitting an unavailability indication based at least in part on determining that the neural signal processor is unavailable.

Aspect 21: The method of Aspect 20, wherein the indication to determine the CSF is carried in at least one of: downlink control information, a medium access control (MAC) control element (MAC-CE), or a combination thereof.

Aspect 22: The method of either of Aspects 20 or 21, wherein the unavailability indication is carried in at least one of: uplink control information, an uplink medium access control (MAC) control element (MAC-CE), or a combination thereof an uplink medium access control (MAC) control element (MAC-CE), or a combination thereof.

Aspect 23: The method of any of Aspects 20-22, wherein determining that the neural signal processor is unavailable comprises: determining that the neural signal processor is performing a task; and determining that a priority level associated with the task is higher than a priority level associated with determining the CSF.

Aspect 24: The method of any of Aspects 20-23, further comprising determining CSI based at least in part on determining that the neural signal processor is unavailable, wherein the CSI comprises at least one of: Type-I CSI, Type-II CSI, or a combination thereof.

Aspect 25: The method of Aspect 24, further comprising transmitting the CSI.

Aspect 26: The method of any of Aspects 20-25, wherein determining that the neural signal processor is unavailable comprises determining that the neural signal processor is unavailable at a first time, where the method further comprises: determining that the neural signal processor is available at a second time; determining the CSF at the second time using the neural signal processor; and transmitting the CSF.

Aspect 27: The method of any of Aspects 1-26, further comprising receiving a capability request, wherein transmitting the neural network capability indication comprises transmitting the neural network capability indication based at least in part on receiving the capability request.

Aspect 28: The method of Aspect 27, wherein the capability request is carried in at least one of: a radio resource control (RRC) message, an RRC channel state information message, a medium access control (MAC) control element (MAC-CE), downlink control information, or a combination thereof.

Aspect 29: The method of either of Aspects 27 or 28, wherein the capability request is carried in a group message addressed to at least one additional first device.

Aspect 30: The method of any of Aspects 1-29, wherein the CSF neural network configuration is carried in a group message addressed to at least one additional first device, and wherein the at least one parameter indicates at least one of:

a number of delay taps to be used for channel compression, a tap energy pruning criterion, or a combination thereof.

Aspect 31: A method of wireless communication performed by a second device, comprising: receiving a neural network capability indication that indicates a capability of a first device associated with training at least one channel state feedback (CSF) neural network for facilitating providing CSF; and transmitting, based at least in part on the capability of the first device, a CSF neural network configuration that indicates at least one parameter associated with the at least one CSF neural network.

Aspect 32: The method of Aspect 31, further comprising determining the CSF neural network configuration based at least in part on the capability of the first device.

Aspect 33: The method of either of Aspects 31 or 32, wherein the at least one parameter indicates a number of CSF neural networks to be configured.

Aspect 34: The method of any of Aspects 31-33, wherein the at least one CSF neural network comprises a plurality of CSF neural networks.

Aspect 35: The method of any of Aspects 31-34, wherein the at least one parameter indicates at least one of: a plurality of bandwidths corresponding to a plurality of CSF neural networks, a plurality of bandwidth parts corresponding to the plurality of CSF neural networks, a plurality of resources corresponding to the plurality of CSF neural networks, a plurality of frequency ranges corresponding to the plurality of CSF neural networks, a plurality of component carriers corresponding to the plurality of CSF neural networks, a plurality of radio access network (RAN) modes corresponding to the plurality of CSF neural networks, or a combination thereof.

Aspect 36: The method of Aspect 35, wherein the at least one parameter indicates: a first CSF neural network of the plurality of CSF neural networks corresponding to a first bandwidth of the plurality of bandwidths; and a second CSF neural network of the plurality of CSF neural networks corresponding to a second bandwidth of the plurality of bandwidths.

Aspect 37: The method of either of Aspects 35 or 36, wherein the at least one parameter indicates: a first CSF neural network of the plurality of CSF neural networks corresponding to a first bandwidth part of the plurality of bandwidth parts; and a second CSF neural network of the plurality of CSF neural networks corresponding to a second bandwidth part of the plurality of bandwidth parts.

Aspect 38: The method of any of Aspects 35-37, wherein the at least one parameter indicates: a first CSF neural network of the plurality of CSF neural networks corresponding to a first resource of the plurality of resources; and a second CSF neural network of the plurality of CSF neural networks corresponding to a second resource of the plurality of resources.

Aspect 39: The method of any of Aspects 35-38, wherein the at least one parameter indicates: a first CSF neural network of the plurality of CSF neural networks corresponding to a first frequency range of the plurality of frequency ranges; and a second CSF neural network of the plurality of CSF neural networks corresponding to a second frequency range of the plurality of frequency ranges.

Aspect 40: The method of Aspect 39, wherein the first frequency range comprises a sub-6 gigahertz frequency range.

Aspect 41: The method of either of Aspects 39 or 40, wherein the second frequency range comprises a millimeter wave frequency range.

Aspect 42: The method of any of Aspects 35-41, wherein the at least one parameter indicates: a first CSF neural network of the plurality of CSF neural networks corresponding to a first component carrier of the plurality of component carriers; and a second CSF neural network of the plurality of CSF neural networks corresponding to a second component carrier of the plurality of component carriers.

Aspect 43: The method of any of Aspects 35-42, wherein the at least one parameter indicates: a first CSF neural network of the plurality of CSF neural networks corresponding to a first RAN mode of the plurality of RAN modes; and a second CSF neural network of the plurality of CSF neural networks corresponding to a second RAN mode of the plurality of RAN modes.

Aspect 44: The method of any of Aspects 31-43, wherein the capability of the first device is based at least in part on an amount of available memory of the first device.

Aspect 45: The method of Aspect 44, wherein the amount of available memory corresponds to at least one bandwidth.

Aspect 46: The method of any of Aspects 31-45, wherein the neural network capability indication indicates at least one neural network complexity parameter corresponding to a neural network complexity that can be supported by the first device.

Aspect 47: The method of Aspect 46, wherein the at least one complexity parameter indicates at least one of: a number of layers associated with the at least one CSF neural network, a number of layers corresponding to a bandwidth part associated with the at least one CSF neural network, a layer characteristic associated with the at least one CSF neural network, a non-linear activation function associated with the at least one CSF neural network, a time dependency capturing type associated with the at least one CSF neural network, a number of stackable layers of time dependencies associated with the at least one CSF neural network, a maximum layer size associated with the at least one CSF neural network, a maximum size of a hidden state in a time dependency layer associated with the at least one CSF neural network, a maximum size of a cell state in a time dependency layer associated with the at least one CSF neural network, a number of delay taps to be used for channel compression, a tap energy pruning criterion, or a combination thereof.

Aspect 48: The method of Aspect 47, wherein the layer characteristic indicates at least one of: a fully-connected layer type, a convolutional layer type, a kernel size, a weight precision value, an activation function, or a combination thereof.

Aspect 49: The method of any of Aspects 31-48, wherein the neural network capability indication indicates a number of neural signal processors available on the first device.

Aspect 50: The method of any of Aspects 31-49, wherein the CSF neural network configuration further indicates a neural network based channel state information (CSI) reference signal (CSI-RS).

Aspect 51: The method of any of Aspects 31-50, wherein the CSF comprises a neural network based CSF and the method further comprises: transmitting an indication to determine the CSF using a neural signal processor; and receiving an unavailability indication that indicates that the neural signal processor is unavailable.

Aspect 52: The method of Aspect 51, wherein the indication to determine the CSF is carried in at least one of: downlink control information, a medium access control (MAC) control element (MAC-CE), or a combination thereof.

Aspect 53: The method of either of Aspects 51 or 52, wherein the unavailability indication is carried in at least one of: uplink control information, an uplink medium access control (MAC) control element (MAC-CE), or a combination thereof. an uplink medium access control (MAC) control element (MAC-CE), or a combination thereof.

Aspect 54: The method of any of Aspects 51-53, further comprising receiving CSI that is based at least in part on a determination that the neural signal processor is unavailable, wherein the CSI comprises at least one of: Type-I CSI, Type-II CSI, or a combination thereof.

Aspect 55: The method of any of Aspects 51-54, further comprising: wherein the unavailability indication indicates that transmission of the CSF is delayed until the neural signal processor is available, wherein the neural signal processor is unavailable at a first time; and receiving the CSF at a second time, wherein the neural signal processor is available at the second time.

Aspect 56: The method of any of Aspects 51-55, further comprising transmitting a capability request, wherein the neural network capability indication is based at least in part on the capability request.

Aspect 57: The method of Aspect 56, wherein the capability request is carried in at least one of: a radio resource control (RRC) message, an RRC channel state information message, a medium access control (MAC) control element (MAC-CE), downlink control information, or a combination thereof.

Aspect 58: The method of Aspect 57, wherein the capability request is carried in a group message addressed to at least one additional first device.

Aspect 59: The method of any of Aspects 31-58, wherein the CSF neural network configuration is carried in a group message addressed to at least one additional first device, and wherein the at least one parameter indicates at least one of: a number of delay taps to be used for channel compression, a tap energy pruning criterion, or a combination thereof.

Aspect 60: An apparatus for wireless communication at a device, comprising a processor; memory coupled with the processor; and instructions stored in the memory and executable by the processor to cause the apparatus to perform the method of one or more of Aspects 1-30.

Aspect 61: A device for wireless communication, comprising a memory and one or more processors coupled to the memory, the one or more processors configured to perform the method of one or more of Aspects 1-30.

Aspect 62: An apparatus for wireless communication, comprising at least one means for performing the method of one or more of Aspects 1-30.

Aspect 63: A non-transitory computer-readable medium storing code for wireless communication, the code comprising instructions executable by a processor to perform the method of one or more of Aspects 1-30.

Aspect 64: A non-transitory computer-readable medium storing a set of instructions for wireless communication, the set of instructions comprising one or more instructions that, when executed by one or more processors of a device, cause the device to perform the method of one or more of Aspects 1-30.

Aspect 65: An apparatus for wireless communication at a device, comprising a processor; memory coupled with the processor; and instructions stored in the memory and executable by the processor to cause the apparatus to perform the method of one or more of Aspects 31-59.

Aspect 66: A device for wireless communication, comprising a memory and one or more processors coupled to the memory, the one or more processors configured to perform the method of one or more of Aspects 31-59.

Aspect 67: An apparatus for wireless communication, comprising at least one means for performing the method of one or more of Aspects 31-59.

Aspect 68: A non-transitory computer-readable medium storing code for wireless communication, the code comprising instructions executable by a processor to perform the method of one or more of Aspects 31-59.

Aspect 69: A non-transitory computer-readable medium storing a set of instructions for wireless communication, the set of instructions comprising one or more instructions that, when executed by one or more processors of a device, cause the device to perform the method of one or more of Aspects 31-59.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first device, comprising:
- transmitting a neural network capability indication that indicates a capability of the first device to train at least one channel state feedback (CSF) neural network to provide CSF;
- receiving, based at least in part on the capability of the first device, a CSF neural network configuration that indicates at least one parameter associated with the at least one CSF neural network;
- receiving an indication to determine the CSF using a neural signal processor;
- determining that the neural signal processor is unavailable; and
- transmitting an unavailability indication based at least in part on determining that the neural signal processor is unavailable.

2. The method of claim 1, wherein the at least one parameter indicates a number of CSF neural networks to be configured.

3. The method of claim 1, wherein the at least one CSF neural network comprises a plurality of CSF neural networks.

4. The method of claim 1, wherein the at least one parameter indicates at least one of:
- a plurality of bandwidths corresponding to a plurality of CSF neural networks,
- a plurality of bandwidth parts corresponding to the plurality of CSF neural networks,
- a plurality of resources corresponding to the plurality of CSF neural networks,
- a plurality of frequency ranges corresponding to the plurality of CSF neural networks,
- a plurality of component carriers corresponding to the plurality of CSF neural networks,
- a plurality of radio access network (RAN) modes corresponding to the plurality of CSF neural networks, or
- a combination thereof.

5. The method of claim 4, wherein the at least one parameter indicates:
- a first CSF neural network of the plurality of CSF neural networks corresponding to a first bandwidth of the plurality of bandwidths; and
- a second CSF neural network of the plurality of CSF neural networks corresponding to a second bandwidth of the plurality of bandwidths.

6. The method of claim 4, wherein the at least one parameter indicates:
- a first CSF neural network of the plurality of CSF neural networks corresponding to a first bandwidth part of the plurality of bandwidth parts; and
- a second CSF neural network of the plurality of CSF neural networks corresponding to a second bandwidth part of the plurality of bandwidth parts.

7. The method of claim 4, wherein the at least one parameter indicates:
- a first CSF neural network of the plurality of CSF neural networks corresponding to a first resource of the plurality of resources; and
- a second CSF neural network of the plurality of CSF neural networks corresponding to a second resource of the plurality of resources.

8. The method of claim 4, wherein the at least one parameter indicates:
- a first CSF neural network of the plurality of CSF neural networks corresponding to a first frequency range of the plurality of frequency ranges; and
- a second CSF neural network of the plurality of CSF neural networks corresponding to a second frequency range of the plurality of frequency ranges.

9. The method of claim 8, wherein the first frequency range comprises a sub-6 gigahertz frequency range.

10. The method of claim 9, wherein the second frequency range comprises a millimeter wave frequency range.

11. The method of claim 4, wherein the at least one parameter indicates:
- a first CSF neural network of the plurality of CSF neural networks corresponding to a first component carrier of the plurality of component carriers; and
- a second CSF neural network of the plurality of CSF neural networks corresponding to a second component carrier of the plurality of component carriers.

12. The method of claim 4, wherein the at least one parameter indicates:
- a first CSF neural network of the plurality of CSF neural networks corresponding to a first RAN mode of the plurality of RAN modes; and
- a second CSF neural network of the plurality of CSF neural networks corresponding to a second RAN mode of the plurality of RAN modes.

13. The method of claim 1, wherein the capability of the first device is based at least in part on an amount of available memory of the first device.

14. The method of claim 13, wherein the amount of available memory corresponds to at least one bandwidth.

15. The method of claim 1, wherein the neural network capability indication indicates at least one neural network complexity parameter corresponding to a neural network complexity that can be supported by the first device.

16. The method of claim 15, wherein the at least one neural network complexity parameter indicates at least one of:
- a number of layers associated with the at least one CSF neural network,
- a number of layers corresponding to a bandwidth part associated with the at least one CSF neural network,
- a layer characteristic associated with the at least one CSF neural network,
- a non-linear activation function associated with the at least one CSF neural network,
- a time dependency capturing type associated with the at least one CSF neural network,
- a number of stackable layers of time dependencies associated with the at least one CSF neural network,
- a maximum layer size associated with the at least one CSF neural network,
- a maximum size of a hidden state in a time dependency layer associated with the at least one CSF neural network,
- a maximum size of a cell state in the time dependency layer associated with the at least one CSF neural network, a number of delay taps to be used for channel compression,
a tap energy pruning criterion, or
a combination thereof.

17. The method of claim 1, wherein the neural network capability indication indicates a number of neural signal processors available on the first device.

18. The method of claim 1, wherein the CSF neural network configuration further indicates a neural network based channel state information (CSI) reference signal (CSI-RS).

19. The method of claim 1, wherein receiving the indication to determine the CSF is based at least in part on the neural network based CSI-RS.

20. The method of claim 1, wherein the indication to determine the CSF is carried in at least one of:
downlink control information,
a medium access control (MAC) control element (MAC-CE), or
a combination thereof.

21. The method of claim 1, wherein the unavailability indication is carried in at least one of:
uplink control information,
an uplink medium access control (MAC) control element (MAC-CE), or
a combination thereof.

22. The method of claim 1, further comprising:
determining CSI based at least in part on determining that the neural signal processor is unavailable, wherein the CSI comprises at least one of Type-I CSI, Type-II CSI, or a combination thereof; and
transmitting the CSI.

23. The method of claim 1, wherein determining that the neural signal processor is unavailable comprises determining that the neural signal processor is unavailable at a first time, and wherein the method further comprises:
determining that the neural signal processor is available at a second time;
determining the CSF at the second time using the neural signal processor; and
transmitting the CSF.

24. The method of claim 1, further comprising receiving a capability request, wherein transmitting the neural network capability indication comprises transmitting the neural network capability indication based at least in part on receiving the capability request.

25. The method of claim 24, wherein the capability request is carried in at least one of:
a radio resource control (RRC) message,
an RRC channel state information message,
a medium access control (MAC) control element (MAC-CE),
downlink control information, or
a combination thereof.

26. The method of claim 24, wherein the capability request is carried in a group message addressed to at least one additional first device.

27. The method of claim 1, wherein the CSF neural network configuration is carried in a group message addressed to at least one additional first device, and wherein the at least one parameter indicates at least one of:
a number of delay taps to be used for channel compression,
a tap energy pruning criterion, or
a combination thereof.

28. A method of wireless communication performed by a second device, comprising:
receiving a neural network capability indication that indicates a capability of a first device to train at least one channel state feedback (CSF) neural network to provide CSF;
transmitting, based at least in part on the capability of the first device, a CSF neural network configuration that indicates at least one parameter associated with the at least one CSF neural network;
transmitting an indication to determine the CSF using a neural signal processor; and
receiving an unavailability indication that indicates a determination that the neural signal processor is unavailable.

29. An apparatus for wireless communication at a first device, comprising:
one or more memories; and
one or more processors, coupled to the one or more memories, configured to cause the first device to:
transmit a neural network capability indication that indicates a capability of the first device to train at least one channel state feedback (CSF) neural network to provide CSF;
receive, based at least in part on the capability of the first device, a CSF neural network configuration that indicates at least one parameter associated with the at least one CSF neural network;
receive an indication to determine the CSF using a neural signal processor;
determine that the neural signal processor is unavailable; and
transmit an unavailability indication based at least in part on determining that the neural signal processor is unavailable.

30. An apparatus for wireless communication at a second device, comprising:
one or more memories; and
one or more processors, coupled to the one or more memories, configured to cause the second device to:
receive a neural network capability indication that indicates a capability of a first device to train at least one channel state feedback (CSF) neural network to provide CSF;
transmit, based at least in part on the capability of the first device, a CSF neural network configuration that indicates at least one parameter associated with the at least one CSF neural network;
transmit an indication to determine the CSF using a neural signal processor; and
receive an unavailability indication that indicates a determination that the neural signal processor is unavailable.

* * * * *